(12) United States Patent
Araki et al.

(10) Patent No.: US 7,910,011 B2
(45) Date of Patent: Mar. 22, 2011

(54) METHOD OF MANUFACTURING MAGNETIC HEAD FOR PERPENDICULAR MAGNETIC RECORDING

(75) Inventors: Hironori Araki, Milpitas, CA (US);
Yoshitaka Sasaki, Milpitas, CA (US);
Hiroyuki Itoh, Milpitas, CA (US);
Shigeki Tanemura, Milpitas, CA (US);
Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 489 days.

(21) Appl. No.: 12/153,987

(22) Filed: May 28, 2008

(65) Prior Publication Data
US 2009/0294402 A1    Dec. 3, 2009

(51) Int. Cl.
*B44C 1/22*    (2006.01)
(52) U.S. Cl. ............. 216/22; 216/66; 216/67; 216/76; 216/77
(58) Field of Classification Search .............. 216/22, 216/66, 67, 76, 77
See application file for complete search history.

(56) References Cited

U.S. PATENT DOCUMENTS

| | | | |
|---|---|---|---|
| 6,710,973 B2 | 3/2004 | Okada et al. | |
| 7,375,925 B2 | 5/2008 | Sasaki et al. | |
| 7,768,742 B2* | 8/2010 | Giorgis et al. | 360/125.13 |
| 2003/0151850 A1 | 8/2003 | Nakamura et al. | |
| 2004/0001282 A1* | 1/2004 | Dinan et al. | 360/125 |
| 2006/0077589 A1 | 4/2006 | Sasaki et al. | |
| 2007/0003793 A1* | 1/2007 | Sakurai et al. | 428/826 |
| 2007/0183092 A1* | 8/2007 | Bedell et al. | 360/126 |
| 2007/0236832 A1* | 10/2007 | Balamane et al. | 360/126 |
| 2007/0242393 A1* | 10/2007 | Gao et al. | 360/324 |
| 2009/0135518 A1* | 5/2009 | Weller et al. | 360/110 |
| 2009/0152235 A1* | 6/2009 | Hsiao et al. | 216/22 |

FOREIGN PATENT DOCUMENTS

JP    A-2006-331613    12/2006

OTHER PUBLICATIONS

U.S. Appl. No. 11/727,371, filed in the name of Sasaki et al., Mar. 26, 2007.
Japanese Office Action dated Aug. 3, 2010 in Japanese Patent Application No. 2008-313458 (with translation).

* cited by examiner

*Primary Examiner* — Binh X Tran
(74) *Attorney, Agent, or Firm* — Oliff & Berridge, PLC

(57) ABSTRACT

A magnetic head includes: a pole layer including a track width defining portion and a wide portion; and an encasing layer disposed on a bottom forming layer and having a groove that accommodates the pole layer. The groove includes a first portion for accommodating at least part of the track width defining portion, and a second portion for accommodating at least part of the wide portion. A manufacturing method for the magnetic head includes: the step of etching a nonmagnetic layer that will become the encasing layer later, such that an initial groove including the first portion is formed in the nonmagnetic layer; the step of forming an initial groove mask covering the first portion; and a second etching step for etching the nonmagnetic layer so as to complete the groove. When the second etching step starts, a portion of the top surface of the bottom forming layer located in a region in which the second portion is to be formed is covered with the nonmagnetic layer or the initial groove mask.

7 Claims, 16 Drawing Sheets

METHOD OF MANUFACTURING MAGNETIC HEAD FOR PERPENDICULAR MAGNETIC RECORDING

BACKGROUND OF THE INVENTION

1. Field of the Invention

The present invention relates to a method of manufacturing a magnetic head for perpendicular magnetic recording that is used for writing data on a recording medium by means of a perpendicular magnetic recording system.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, as do magnetic heads for longitudinal magnetic recording, a structure in which a read head having a magnetoresistive element (hereinafter also referred to an MR element) for reading and a write head having an induction-type electromagnetic transducer for writing are stacked on a substrate. The write head includes a pole layer that generates a magnetic field in the direction perpendicular to the plane of the recording medium. The pole layer includes, for example, a track width defining portion having an end located in a medium facing surface that faces toward the recording medium, and a wide portion that is coupled to the other end of the track width defining portion and that is greater in width than the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, as the track width is reduced, the write characteristics, such as overwrite property that is a parameter indicating overwriting capability, suffer degradation. It is therefore required to achieve better write characteristics as the track width is reduced. Here, the length of the track width defining portion taken in the direction perpendicular to the medium facing surface is called a neck height. The smaller the neck height, the better is the overwrite property.

A magnetic head for use in a magnetic disk drive such as a hard disk drive is typically provided in a slider. The slider has the medium facing surface mentioned above. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits better capability of writing on a recording medium compared with that of the longitudinal magnetic recording system, the occurrence of the skew mentioned above results in problems such as a phenomenon in which, when data is written on a certain track, data stored on a track adjacent thereto is erased (this phenomenon is hereinafter referred to as adjacent track erasing), and unwanted writing between two adjacent tracks. To achieve higher recording density, it is required to suppress adjacent track erasing. Unwanted writing between two adjacent tracks affects detection of servo signals for alignment of the magnetic head and the signal-to-noise ratio of a read signal.

As one of techniques for preventing the above problems resulting from the skew, there is known a technique in which the end face of the track width defining portion located in the medium facing surface is formed into such a shape that the side located backward along the direction of travel of the recording medium (that is, the side located closer to the air inflow end of the slider) is shorter than the opposite side, as disclosed in, for example, U.S. Pat. No. 6,710,973 B2, U.S. Patent Application Publication No. US2003/0151850 A1, and U.S. Patent Application Publication No. US2006/0077589 A1. In the medium facing surface of a magnetic head, typically, the end farther from the substrate is located forward along the direction of travel of the recording medium (that is, located closer to the air outflow end of the slider). Therefore, the shape of the end face of the track width defining portion located in the medium facing surface mentioned above is such that the side closer to the substrate is shorter than the side farther from the substrate.

Consideration will now be given to a method of forming a pole layer in which the end face of the track width defining portion located in the medium facing surface has such a shape that the side closer to the substrate is shorter than the side farther from the substrate, as mentioned above. U.S. Pat. No. 6,710,973 and U.S. Patent Application Publication No. US2003/0151850 A1 each disclose a method including forming a groove in an inorganic insulating film by selectively etching the inorganic insulating film using a mask made of photoresist, and forming the pole layer in this groove. U.S. Patent Application Publication No. US2006/0077589 A1 discloses a method including forming a nonmagnetic conductive layer on a nonmagnetic layer, forming an opening in the nonmagnetic conductive layer by selectively etching the nonmagnetic conductive layer using a mask made of photoresist, forming a groove in the nonmagnetic layer by selectively etching a portion of the nonmagnetic layer exposed from the opening of the nonmagnetic conductive layer by reactive ion etching (hereinafter also referred to as RIE), and forming the pole layer in this groove.

If formed by any of the methods disclosed in U.S. Pat. No. 6,710,973 B2, U.S. Patent Application Publication No. US2003/0151850 A1 and U.S. Patent Application Publication No. US2006/0077589 A1, the resultant pole layer has such a shape that, along the entire perimeter of the pole layer, the side surface of the pole layer is mostly inclined with respect to the direction perpendicular to the top surface of the substrate. The pole layer having such a shape is smaller in area of the cross section thereof perpendicular to the direction in which magnetic flux flows, as compared with a case in which the entire side surface of the pole layer is perpendicular to the top surface of the substrate. The pole layer having the above-described shape cannot allow a magnetic flux of great magnitude to pass through a portion near the boundary between the track width defining portion and the wide portion, in particular, and this results in degradation of the write characteristics such as overwrite property. For this reason, in the pole layer having the above-described shape, the neck height must be reduced in order to suppress degradation of the write characteristics.

A portion of the side surface of the pole layer near the boundary between the track width defining portion and the wide portion is difficult to form accurately. Consequently, in the pole layer, the portion near the boundary between the track width defining portion and the wide portion tends to have such a shape that the width gradually increases with increasing distance from the medium facing surface. Accordingly, as the neck height is reduced, it becomes difficult to accurately define the width of the track width defining portion in the medium facing surface, that is, the track width.

For the above-described reasons, conventionally, it has been difficult to form a pole layer that is capable of preventing the problems resulting from the skew, capable of defining the track width accurately, and capable of improving the write characteristics.

OBJECT AND SUMMARY OF THE INVENTION

It is an object of the present invention to provide a method of manufacturing a magnetic head for perpendicular magnetic recording that makes it possible to form a pole layer capable of preventing the problems resulting from the skew, capable of defining the track width with precision, and capable of improving the write characteristics.

A magnetic head for perpendicular magnetic recording manufactured by a first or a second manufacturing method of the present invention includes:

a medium facing surface that faces toward a recording medium;

a coil that generates a magnetic field corresponding to data to be written on the recording medium;

a pole layer that allows a magnetic flux corresponding to the magnetic field generated by the coil to pass and generates a write magnetic field for writing the data on the recording medium by means of a perpendicular magnetic recording system;

a bottom forming layer made of a nonmagnetic material;

an encasing layer made of a nonmagnetic material, disposed on the bottom forming layer, and having a groove that opens at a top surface of the encasing layer and that accommodates the pole layer; and a substrate on which the bottom forming layer, the encasing layer, the pole layer and the coil are stacked, the substrate having a top surface.

The pole layer includes: a track width defining portion having an end face that is located in the medium facing surface and that defines a track width, and having an end opposite to the end face; and a wide portion connected to the end of the track width defining portion and having a width greater than that of the track width defining portion. The end face of the track width defining portion located in the medium facing surface has a width that decreases with decreasing distance from the top surface of the substrate. The groove includes: a first portion for accommodating at least part of the track width defining portion of the pole layer; and a second portion for accommodating at least part of the wide portion of the pole layer, the second portion being farther from the medium facing surface than the first portion. The first portion has a width that decreases with decreasing distance from the top surface of the substrate. The second portion penetrates the encasing layer.

The first manufacturing method for the magnetic head for perpendicular magnetic recording of the present invention includes the steps of:

forming the bottom forming layer;

forming a nonmagnetic layer on the bottom forming layer, the nonmagnetic layer being intended to undergo formation of the groove therein later to thereby become the encasing layer;

forming a groove defining layer on the nonmagnetic layer, the groove defining layer having a penetrating opening that has a shape corresponding to a plane geometry of the groove to be formed later;

forming the groove in the nonmagnetic layer so that the nonmagnetic layer becomes the encasing layer;

forming the pole layer such that the pole layer is accommodated in the groove of the encasing section; and forming the coil.

In the first manufacturing method of the present invention, the step of forming the groove in the nonmagnetic layer includes: a first etching step for taper-etching the nonmagnetic layer by reactive ion etching so as to form an initial groove in the nonmagnetic layer, the initial groove including the first portion of the groove of the encasing layer; a step of forming an initial groove mask that covers the first portion of the initial groove; and a second etching step for etching the nonmagnetic layer by reactive ion etching, with the initial groove mask and the groove defining layer used as an etching mask, so as to complete the groove. Each of the bottom forming layer and the groove defining layer is lower in etching rate in the first and second etching steps than the nonmagnetic layer.

In the first etching step, the nonmagnetic layer is etched such that an initial sidewall is formed by the initial groove in a region in which the second portion is to be formed, the initial sidewall being intended to be etched in the second etching step later to thereby become a sidewall of the second portion, and such that part of the nonmagnetic layer remains on the bottom forming layer in the region in which the second portion is to be formed. In the second etching step, the initial sidewall is etched to thereby form the sidewall of the second portion.

In the first manufacturing method of the present invention, the nonmagnetic layer may be formed of $Al_2O_3$, and each of the bottom forming layer and the groove defining layer may be formed of a nonmagnetic metal material.

In the first manufacturing method of the present invention, in the second etching step, the initial sidewall may be etched so that an angle formed by the sidewall of the second portion with respect to a direction perpendicular to the top surface of the substrate will be smaller than an angle formed by the initial sidewall with respect to the direction perpendicular to the top surface of the substrate.

In the first manufacturing method of the present invention, the step of forming the groove in the nonmagnetic layer may further include a step of forming a mask on the nonmagnetic layer before the first etching step so that, in the region in which the second portion is to be formed, part of the nonmagnetic layer will remain on the bottom forming layer in the first etching step.

The second manufacturing method for the magnetic head for perpendicular magnetic recording of the present invention includes the steps of:

forming the bottom forming layer;

forming a nonmagnetic layer on the bottom forming layer, the nonmagnetic layer being intended to undergo formation of the groove therein later to thereby become the encasing layer;

forming a groove defining layer on the nonmagnetic layer, the groove defining layer having a penetrating opening that has a shape corresponding to a plane geometry of the groove to be formed later;

forming the groove in the nonmagnetic layer so that the nonmagnetic layer becomes the encasing layer;

forming the pole layer such that the pole layer is accommodated in the groove of the encasing section; and forming the coil.

In the second manufacturing method of the present invention, the step of forming the groove in the nonmagnetic layer includes: a first etching step for taper-etching the nonmagnetic layer by reactive ion etching so as to form an initial groove in the nonmagnetic layer, the initial groove including the first portion of the groove of the encasing layer; a step of forming an initial groove mask that covers the first portion of the initial groove; and a second etching step for etching the nonmagnetic layer by reactive ion etching, with the initial groove mask and the groove defining layer used as an etching mask, so as to complete the groove. Each of the bottom forming layer and the groove defining layer is lower in etching rate in the first and second etching steps than the nonmagnetic layer.

In the first etching step, the nonmagnetic layer is etched such that an initial sidewall is formed by the initial groove in a region in which the second portion is to be formed, the initial sidewall being intended to be etched in the second etching step later to thereby become a sidewall of the second portion, and such that a top surface of the bottom forming layer is exposed in the region in which the second portion is to be formed. In the step of forming the initial groove mask, the initial groove mask is formed such that the initial groove mask covers, in addition to the first portion, part of the top surface of the bottom forming layer exposed by the initial groove in the region in which the second portion is to be formed. In the second etching step, the initial sidewall is etched to thereby form the sidewall of the second portion.

In the second manufacturing method of the present invention, the nonmagnetic layer may be formed of $Al_2O_3$, and each of the bottom forming layer and the groove defining layer may be formed of a nonmagnetic metal material.

In the second manufacturing method of the present invention, in the second etching step, the initial sidewall may be etched so that an angle formed by the sidewall of the second portion with respect to a direction perpendicular to the top surface of the substrate will be smaller than an angle formed by the initial sidewall with respect to the direction perpendicular to the top surface of the substrate.

According to the first or second manufacturing method of the present invention, the step of forming the groove in the nonmagnetic layer includes the first etching step, the step of forming the initial groove mask, and the second etching step. This makes it possible to form a pole layer that is capable of preventing the problems resulting from the skew, capable of defining the track width with precision, and capable of improving the write characteristics. In particular, the second etching step of the present invention prevents formation of a sidewall-protecting film on the sidewall of the second portion of the groove, and thereby serves to suppress an increase in the angle formed by the sidewall of the second portion with respect to the direction perpendicular to the top surface of the substrate. This allows the above-listed advantageous effects of the invention to be exerted more remarkably.

Other objects, features and advantages of the present invention will become fully apparent from the following description.

DETAILED DESCRIPTION OF THE PREFERRED EMBODIMENTS

First Embodiment

Figure 1:
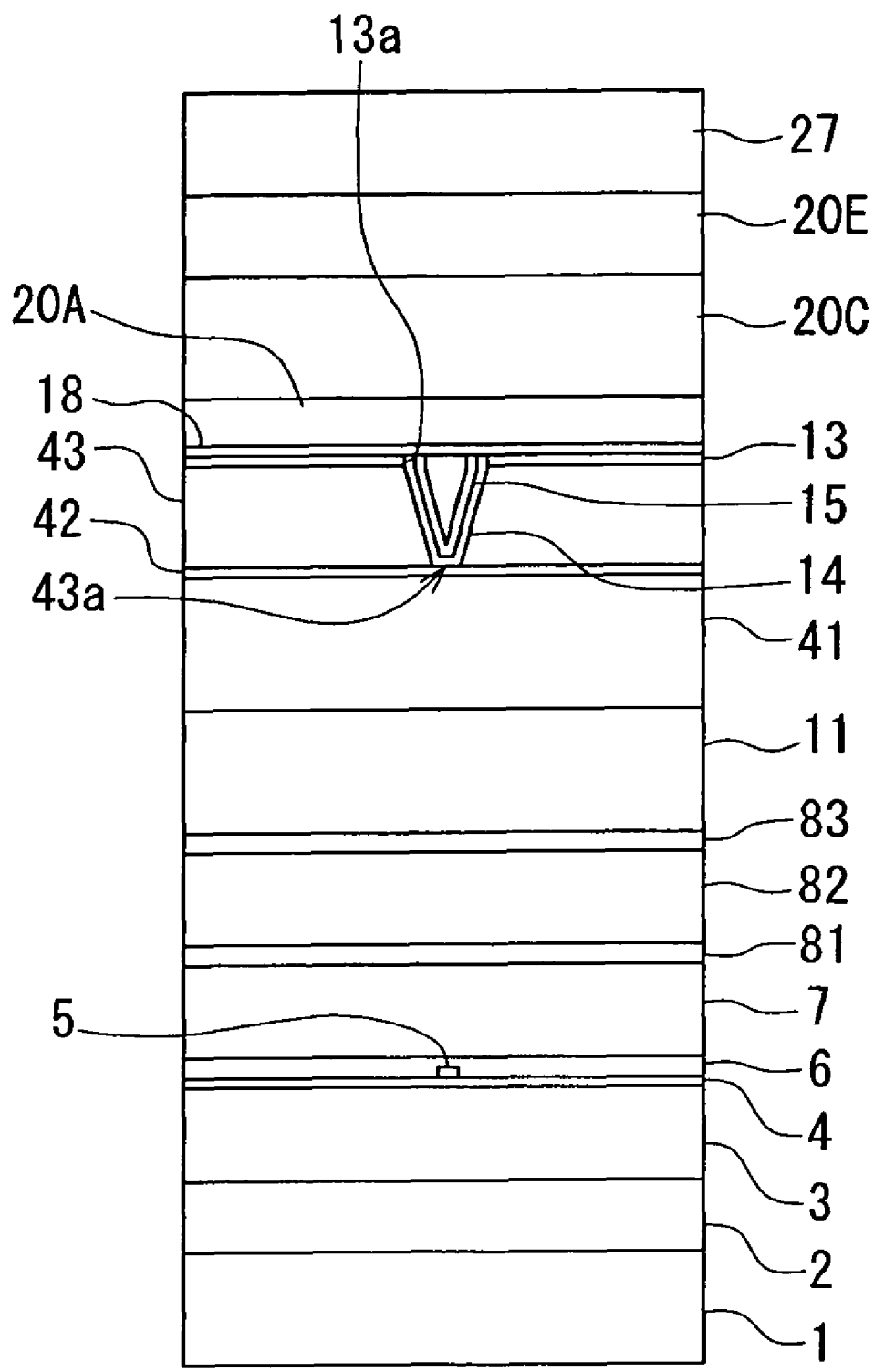
FIG. 1 is a front view of the medium facing surface of a magnetic head of a first embodiment of the invention.
Figure 2:
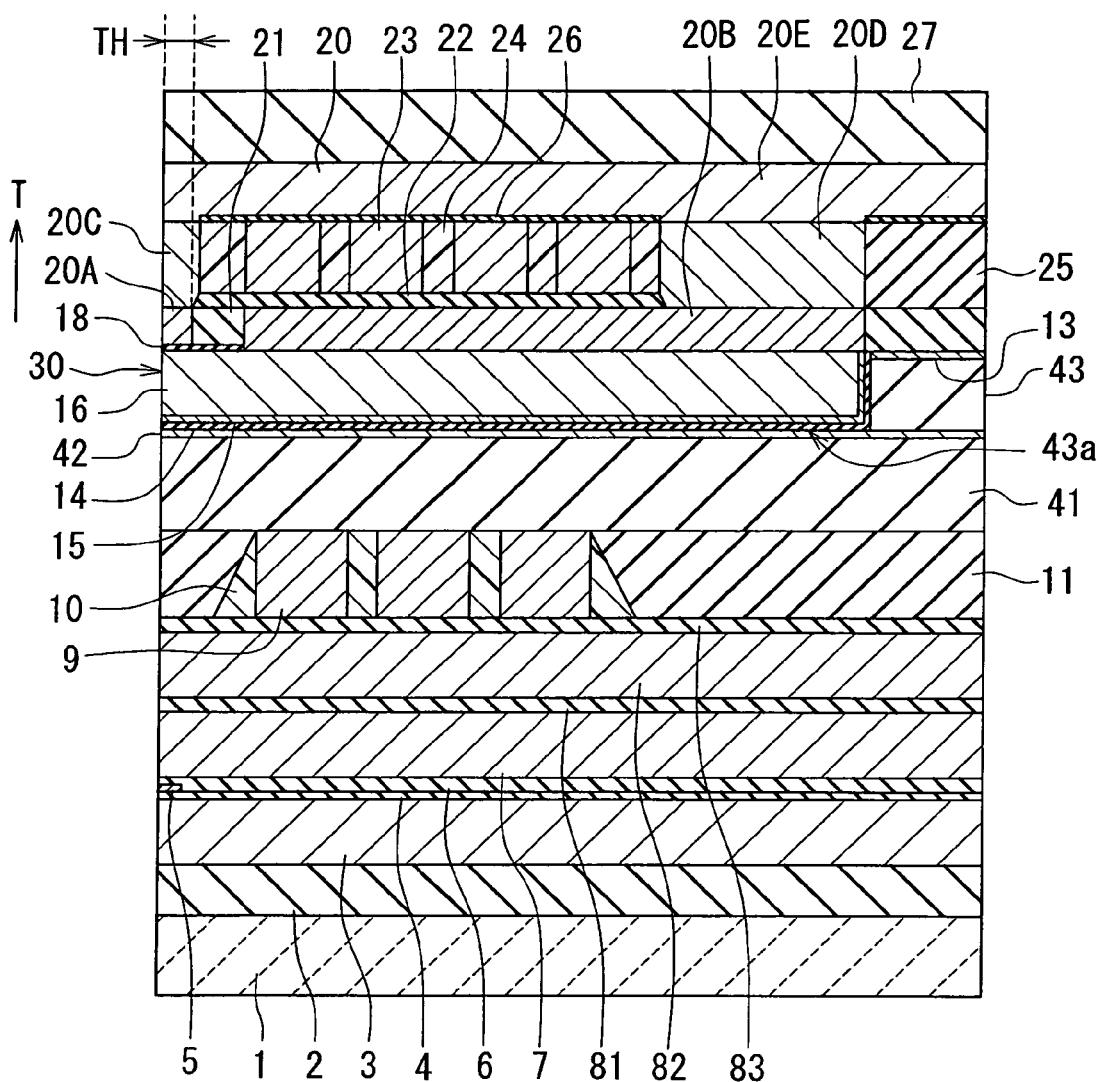
FIG. 2 is a cross-sectional view showing the configuration of the magnetic head of the first embodiment of the invention.

Embodiments of the present invention will now be described in detail with reference to the drawings. Reference is first made to FIG. 1 and FIG. 2 to describe the configuration of a magnetic head for perpendicular magnetic recording of a first embodiment of the invention. FIG. 1 is a front view of the medium facing surface of the magnetic head for perpendicular magnetic recording of the first embodiment. FIG. 2 is a cross-sectional view showing the configuration of the magnetic head for perpendicular magnetic recording of the first embodiment. FIG. 2 shows a cross section perpendicular to the medium facing surface and the top surface of the substrate. In FIG. 2 the arrow marked with T shows the direction of travel of the recording medium.

As shown in FIG. 1 and FIG. 2, the magnetic head for perpendicular magnetic recording (hereinafter simply referred to as the magnetic head) of the present embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

An end of the MR element 5 is located in the medium facing surface 30 that faces toward the recording medium. The MR element 5 may be an element made of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The magnetic head further includes a nonmagnetic layer 81 and a second top shield layer 82 that are disposed in this order on the first top shield layer 7. The nonmagnetic layer 81 is made of a nonmagnetic material such as alumina. The second top shield layer 82 is made of a magnetic material. The portion from the bottom shield layer 3 to the second top shield layer 82 makes up a read head.

The magnetic head further includes: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is planar spiral-shaped. The top surfaces of the coil 9 and the insulating layers 10 and 11 are planarized. The insulating layers 83 and 11 are made of alumina, for example. The insulating layer 10 is made of photoresist, for example. The coil 9 is made of a conductive material such as copper.

The magnetic head further includes: a nonmagnetic layer 41 made of a nonmagnetic material and disposed on the planarized top surfaces of the coil 9 and the insulating layers 10 and 11; a bottom forming layer 42 disposed on the nonmagnetic layer 41; and an encasing layer 43 disposed on the bottom forming layer 42. The nonmagnetic layer 41 is made of alumina, for example. The bottom forming layer 42 can be made of, for example, a nonmagnetic metal material such as Ru, NiB, NiP, NiCr, Pd. V, Cr, Nb, Te, Rh, Ir, Re, Rb, Cs or NiCu. The encasing layer 43 has a groove 43a that opens at the top surface of the encasing layer 43 and that accommodates a pole layer described later. The encasing layer 43 is made of, for example, an insulating material such as alumina, silicon oxide ($SiO_x$) or silicon oxynitride (SiON).

The magnetic head further includes a groove defining layer 13 disposed on the top surface of the encasing layer 43. The groove defining layer 13 is a layer for defining the shape of the groove 43a. The groove defining layer 13 has a penetrating opening 13a that has a shape corresponding to the plane geometry of the groove 43a. The edge of the opening 13a is located directly on the edge of the groove 43a located at the top surface of the encasing layer 43. The groove defining layer 13 is made of, for example, a nonmagnetic metal material such as Ta, Mo, W, Ti, Ru, Rh, Re, Pt, Pd, Ir, NiCr, NiP, NiB, $WSi_2$, $TaSi_2$, $TiSi_2$, TiN or TiW.

The magnetic head further includes a nonmagnetic film 14 made of a nonmagnetic material, a polishing stopper layer 15, and the pole layer 16 that are disposed in the groove 43a of the encasing layer 43 and in the opening 13a of the groove defining layer 13. The nonmagnetic film 14 is disposed to touch the surface of the groove 43a. The pole layer 16 is disposed apart from the surface of the groove 43a. In the groove 43a the nonmagnetic film 14 is disposed to be sandwiched between the encasing layer 43 and the pole layer 16. In the groove 43a the polishing stopper layer 15 is disposed to be sandwiched between the nonmagnetic film 14 and the pole layer 16.

The nonmagnetic film 14 is made of a nonmagnetic material. The material of the nonmagnetic film 14 may be an insulating material or a semiconductor material, for example. Examples of the insulating material usable as the material of the nonmagnetic film 14 include alumina, silicon oxide ($SiO_x$), and silicon oxynitride (SiON). Examples of the semiconductor material usable as the material of the nonmagnetic film 14 include polycrystalline silicon and amorphous silicon.

The polishing stopper layer 15 is made of a nonmagnetic metal material. The polishing stopper layer 15 may be made of the same nonmagnetic metal material as that used for the groove defining layer 13.

The pole layer 16 is made of a magnetic metal material. The pole layer 16 can be made of any of CoFeN, CoNiFe, NiFe, and CoFe, for example.

The magnetic head further includes a gap layer 18 disposed on the top surfaces of the groove defining layer 13, the nonmagnetic film 14, the polishing stopper layer 15 and the pole layer 16. The gap layer 18 has an opening located away from the medium facing surface 30. The gap layer 18 may be made of an insulating material such as alumina or a nonmagnetic metal material such as Ru, NiCu, Ta, W, NiB or NiP.

The magnetic head further includes a shield 20. The shield 20 includes: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E can be made of any of CoFeN, CoNiFe, NiFe and CoFe, for example.

The magnetic head further includes a nonmagnetic layer 21 made of a nonmagnetic material and disposed around the yoke layer 20B. Part of the nonmagnetic layer 21 is disposed on a side of the first layer 20A. The nonmagnetic layer 21 is made of, for example, an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be, for example, a refractory metal such as Ta, Mo, Nb, W, Cr, Ru, NiCu, Pd or Hf.

The magnetic head further includes: an insulating layer 22 disposed on regions of the top surfaces of the yoke layer 20B and the nonmagnetic layer 21 above which a coil 23 described later is to be disposed; the coil 23 disposed on the insulating layer 22; an insulating layer 24 disposed around the coil 23 and in the space between the respective adjacent turns of the coil 23; an insulating layer 25 disposed around the insulating layer 24; and an insulating layer 26 disposed on the coil 23 and the insulating layers 24 and 25. The coil 23 is planar spiral-shaped. Part of the coil 23 passes between the second layer 20C and the coupling layer 20D. The coil 23 is made of a conductive material such as copper. The top surfaces of the second layer 20C, the coupling layer 20D and the insulating layers 24 and 25 are planarized. The insulating layer 24 is made of photoresist, for example. The insulating layers 22, 25 and 26 are made of alumina, for example.

The portion from the coil 9 to the third layer 20E of the shield 20 makes up a write head. The magnetic head further includes a protection layer 27 formed to cover the shield 20. The protection layer 27 is made of alumina, for example.

As described so far, the magnetic head of the present embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, portions of the shield layers 3 and 7 closer to the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the coil 9, the nonmagnetic layer 41, the bottom forming layer 42, the encasing layer 43, the groove defining layer 13, the nonmagnetic film 14, the polishing stopper layer 15, the pole layer 16, the gap layer 18, the shield 20, and the coil 23. The coils 9 and 23 generate a magnetic field corresponding to data to be written on the recording medium. The coil 9 is not an essential component of the write head and may be dispensed with. The nonmagnetic film 14 may also be dispensed with.

The pole layer 16 has an end face located in the medium facing surface 30. The pole layer 16 allows a magnetic flux corresponding to the magnetic field generated by the coil 23 to pass, and generates a write magnetic field for writing the data on the recording medium by means of the perpendicular magnetic recording system.

The shield 20 has an end face located in the medium facing surface 30, and is coupled to a portion of the pole layer 16 away from the medium facing surface 30. The gap layer 18 is made of a nonmagnetic material, and is provided between the pole layer 16 and the shield 20.

In the medium facing surface 30, the end face of the shield 20 is disposed forward of the end face of the pole layer 16 along the direction T of travel of the recording medium, with a predetermined distance provided therebetween by the thickness of the gap layer 18. The thickness of the gap layer 18 is within a range of 20 to 50 nm, for example. At least part of the coil 23 is located between the pole layer 16 and the shield 20 and insulated from the pole layer 16 and the shield 20.

The encasing layer 43 has the groove 43a that opens at the top surface of the encasing layer 43 and that accommodates the pole layer 16. The groove 43a penetrates the encasing layer 43. The pole layer 16 is disposed in the space surrounded by the top surface of the bottom forming layer 42, the groove 43a of the encasing layer 43 and the opening 13a of the groove defining layer 13. In the groove 43a the nonmagnetic film 14 is disposed to be sandwiched between the encasing layer 43 and the pole layer 16. In the groove 43a the polishing stopper layer 15 is disposed to be sandwiched between the nonmagnetic film 14 and the pole layer 16. The nonmagnetic film 14 has a thickness within a range of 20 to 80 nm, for example. However, the thickness of the nonmagnetic film 14 is not limited to this range and can be appropriately chosen according to the track width. The polishing stopper layer 15 has a thickness within a range of 20 to 80 nm, for example.

The shield 20 includes: the first layer 20A disposed adjacent to the gap layer 18; the second layer 20C located on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and at least part of the coil 23. The coil 23 is wound around the coupling layer 20D. In the example shown in FIG. 2, part of the yoke layer 20B is disposed between the pole layer 16 and part of the coil 23. However, in place of such a yoke layer 20B, there may be provided a coupling layer that has a plane geometry the same as that of the coupling layer 20D and that couples the pole layer 16 to the coupling layer 20D.

The first layer 20A has a first end located in the medium facing surface 30 and a second end opposite to the first end. The second layer 20C also has a first end located in the medium facing surface 30 and a second end opposite to the first end. Throat height TH is the distance between the medium facing surface 30 and a point at which the space between the pole layer 16 and the shield 20 starts to increase as seen from the medium facing surface 30. In the present embodiment, the throat height TH is the distance between the medium facing surface 30 and an end of the first layer 20A farther from the medium facing surface 30. The throat height TH is within a range of 0.05 to 0.3 μm, for example.

Figure 3:
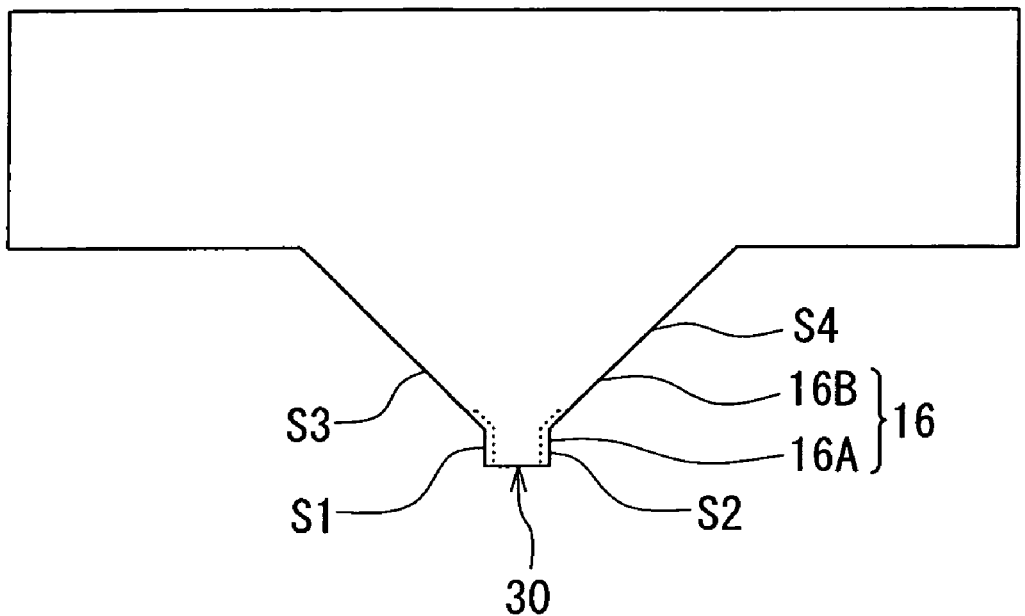
FIG. 3 is a top view of a pole layer of the magnetic head of the first embodiment of the invention.
Figure 4:
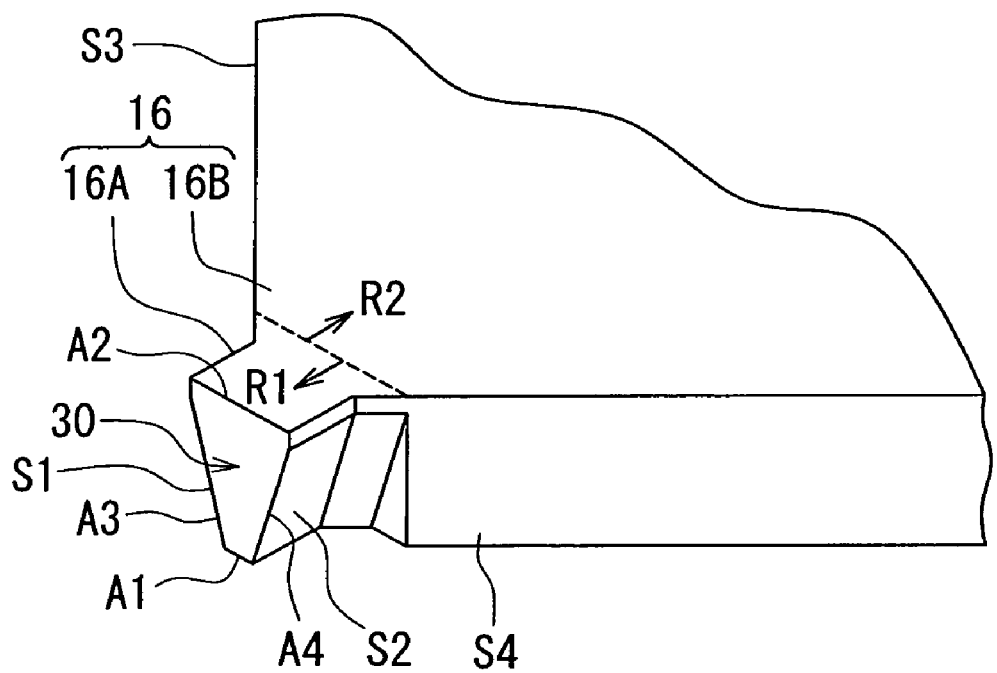
FIG. 4 is a perspective view showing a portion of the pole layer of the magnetic head of the first embodiment of the invention.

Reference is now made to FIG. 3 and FIG. 4 to describe the shape of the pole layer 16 in detail. FIG. 3 is a top view of the pole layer 16. FIG. 4 is a perspective view showing a portion of the pole layer 16 in the vicinity of the medium facing surface 30.

As shown in FIG. 3 and FIG. 4, the pole layer 16 includes a track width defining portion 16A and a wide portion 16B. The track width defining portion 16A has an end face located in the medium facing surface 30 and an end opposite to the end face. The wide portion 16B is connected to the end of the track width defining portion 16A and has a width greater than that of the track width defining portion 16A. The width of the track width defining portion 16A does not change substantially in accordance with the distance from the medium facing surface 30. For example, the wide portion 16B is equal in width to the track width defining portion 16A at the boundary with the track width defining portion 16A, and gradually increases in width as the distance from the medium facing surface 30 increases and then maintains a specific width to the end of the wide portion 16B. In the present embodiment the track width defining portion 16A is defined as a portion of the pole layer 16 that extends from the end face located in the medium facing surface 30 to the point at which the width of the pole layer 16 starts to increase. Here, the length of the track width defining portion 16A taken in the direction perpendicular to the medium facing surface 30 is called a neck height. The neck height is within a range of 60 to 200 nm, for example.

As shown in FIG. 4, the end face of the track width defining portion 16A located in the medium facing surface 30 has: a first side A1 closest to the substrate 1; a second side A2 opposite to the first side A1; a third side A3 connecting an end of the first side A1 and an end of the second side A2 to each other; and a fourth side A4 connecting the other end of the first side A1 and the other end of the second side A2 to each other. The second side A2 defines the track width. The end face of the track width defining portion 16A located in the medium facing surface 30 has a width that decreases with decreasing distance from the first side A1. Each of the third side A3 and the fourth side A4 forms an angle of, for example, 8 to 15 degrees, with respect to the direction perpendicular to the top surface of the substrate 1. The length of the second side A2, that is, the track width, is within a range of 0.05 to 0.20 μm, for example. The thickness of the pole layer 16 taken in the medium facing surface 30 is within a range of 0.15 to 0.3 μm, for example.

As shown in FIG. 3, the pole layer 16 has: a first side surface S1 and a second side surface S2 located opposite to each other in a first region R1 that extends from the medium facing surface 30 to a position 10 to 300 nm away from the medium facing surface 30; and a third side surface S3 and a fourth side surface S4 located in a second region R2 other than the first region R1. The first side surface S1 and the third side surface S3 are located on the same side as seen from the center of the pole layer 16 taken in the track width direction. The second side surface S2 and the fourth side surface S4 are located such that the locations of the second and fourth side surfaces S2, S4 and the locations of the first and third side surfaces S1, S3 are symmetric with respect to the center of the pole layer 16 taken in the track width direction.

The distance between the first side surface S1 and the second side surface S2 taken in the track width direction decreases with decreasing distance from the top surface of the substrate 1. The distance between the third side surface S3 and the fourth side surface S4 taken in the track width direction may be uniform regardless of the distance from the top surface of the substrate 1, or may decrease or increase with decreasing distance from the top surface of the substrate 1. The angle formed by the third side surface S3 with respect to the direction perpendicular to the top surface of the substrate 1 is smaller than the angle formed by the first side surface S1 with respect to the direction perpendicular to the top surface of the substrate 1. The angle formed by the fourth side surface S4 with respect to the direction perpendicular to the top surface of the substrate 1 is smaller than the angle formed by the second side surface S2 with respect to the direction perpendicular to the top surface of the substrate 1. In the case where the distance between the third side surface S3 and the fourth side surface S4 taken in the track width direction decreases with decreasing distance from the top surface of the substrate 1, it is preferred that each of the angle formed by the third side surface S3 with respect to the direction perpendicular to the top surface of the substrate 1 and the angle formed by the fourth side surface S4 with respect to the direction perpendicular to the top surface of the substrate 1 be as close as possible to zero degree.

FIG. 4 shows an example in which the distance from the medium facing surface 30 to the boundary between the first region R1 and the second region R2 is greater than the distance from the medium facing surface 30 to the boundary between the track width defining portion 16A and the wide portion 16B, that is, the neck height. However, the distance from the medium facing surface 30 to the boundary between the first region R1 and the second region R2 may be equal to or smaller than the neck height.

Figure 5A:
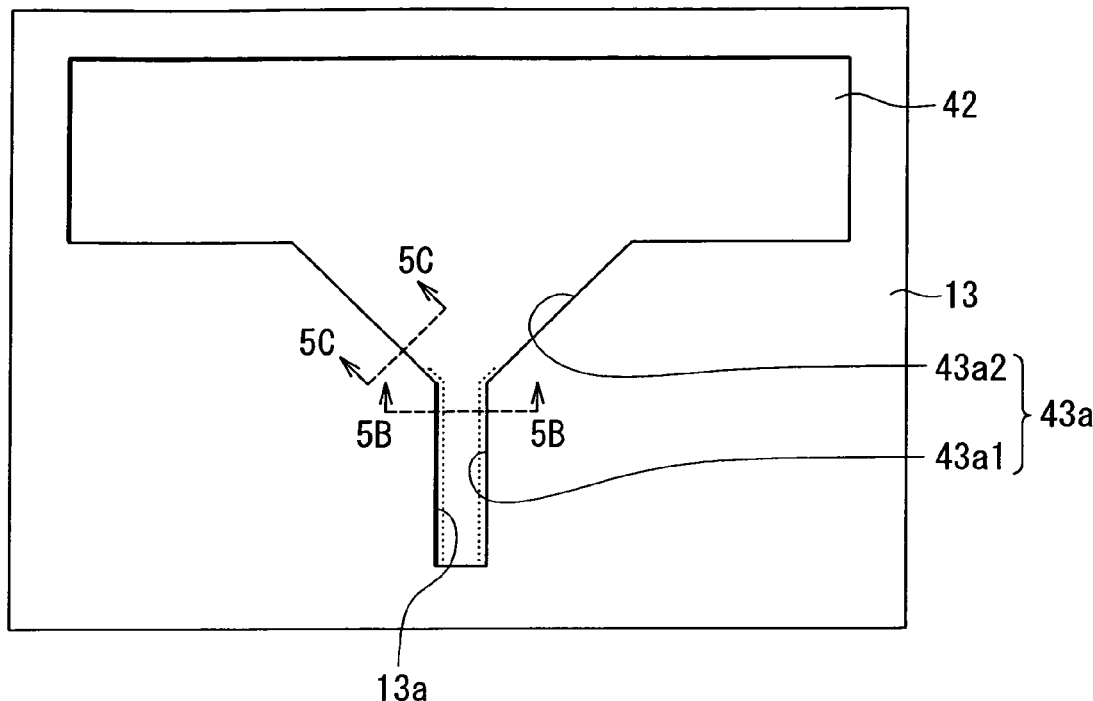
FIG. 5A to FIG. 5C are illustrative views showing a groove of an encasing layer of the magnetic head of the first embodiment of the invention.
Figure 5B:
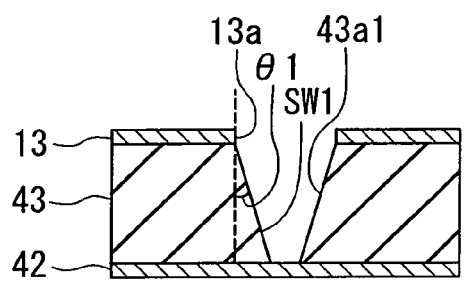
Figure 5C:
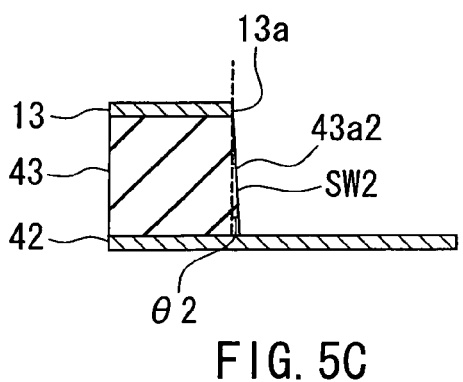

Reference is now made to FIG. 5A to FIG. 5C to describe the bottom forming layer 42, the encasing layer 43 and the groove defining layer 13 in detail. FIG. 5A is a top view of a stack of the bottom forming layer 42, the encasing layer 43 and the groove defining layer 13. FIG. 5B is a cross-sectional view of the stack of FIG. 5A taken along line 5B-5B. FIG. 5C is a cross-sectional view of the stack of FIG. 6A taken along line 5C-5C.

As shown in FIG. 5A to FIG. 5C, the encasing layer 43 is disposed on the bottom forming layer 42, and has the groove 43a that opens at the top surface of the encasing layer 43 to accommodate the pole layer 16. The groove defining layer 13 is disposed on the encasing layer 43, and has the penetrating opening 13a that has a shape corresponding to the plane geometry of the groove 43a. The edge of the opening 13a is located directly on the edge of the groove 43a located at the top surface of the encasing layer 43.

The groove 43a of the encasing layer 43 includes: a first portion 43a1 for accommodating at least part of the track width defining portion 16A of the pole layer 16; and a second portion 43a2 for accommodating at least part of the wide portion 16B of the pole layer 16. The second portion 43a2 is farther from the medium facing surface 30 than the first portion 43a1. The first portion 43a1 is to accommodate the portion of the pole layer 16 located in the region R1 shown in FIG. 4. The second portion 43a2 is to accommodate the portion of the pole layer 16 located in the region R2 shown in FIG. 4. The first portion 43a1 has a width that decreases with decreasing distance from the top surface of the substrate 1. Of the groove 43a, at least the second portion 43a2 penetrates the encasing layer 43. FIG. 5A to FIG. 5C show an example in which the whole of the groove 43a penetrates the encasing layer 43.

Here, as shown in FIG. 5B, the first portion 43a1 has a sidewall SW1 that forms an angle θ1 with respect to the direction perpendicular to the top surface of the substrate 1. The angle θ1 is equal or nearly equal to the angle formed by each of the third side A3 and the fourth side A4 shown in FIG. 4 with respect to the direction perpendicular to the top surface of the substrate 1. The angle θ1 is within the range of 8 to 15 degrees, for example.

The second portion 43a2 has a sidewall SW2 that may be perpendicular to the top surface of the substrate 1 or may be inclined with respect to the direction perpendicular to the top surface of the substrate 1. Here, as shown in FIG. 5C, θ2 represents the angle formed by the sidewall SW2 of the second portion 43a2 with respect to the direction perpendicular to the top surface of the substrate 1. The angle θ2 is smaller than the angle θ1. The angle θ2 is within a range of 0 degree to 3.5 degrees, for example.

Reference is now made to FIG. 6A to FIG. 10C to describe a method of manufacturing the magnetic head of the present embodiment. FIG. 6A to FIG. 10C are illustrative views showing a method of forming the groove of the encasing layer of the embodiment. The portions closer to the substrate 1 than is the bottom forming layer 42 are omitted in FIG. 6A to FIG. 10C.

In the method of manufacturing the magnetic head of the embodiment, first, as shown in FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7, the nonmagnetic layer 81, the second top shield layer 82 and the insulating layer 83 are formed in this order on the top shield gap film 6. Next, the coil 9 and the insulating layers 10 and 11 are formed on the insulating layer 83. Next, the top surfaces of the coil 9 and the insulating layers 10 and 11 are planarized by, for example, chemical mechanical polishing (hereinafter referred to as CMP). Next, the nonmagnetic layer 41 is formed on the planarized top surfaces of the coil 9 and the insulating layers 10 and 11.

Figure 6A:
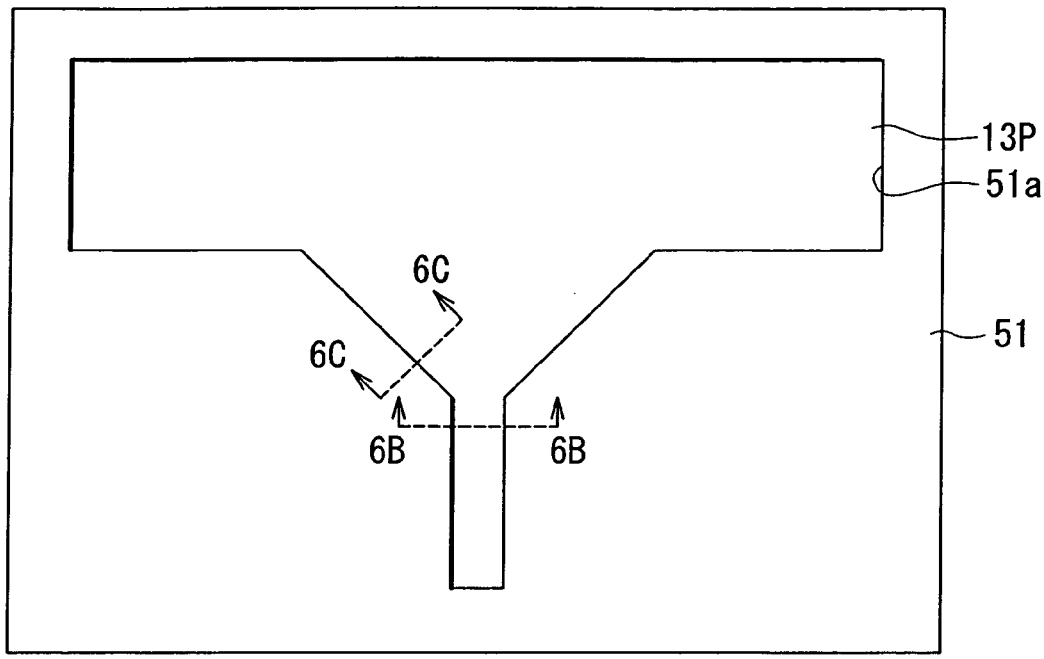
FIG. 6A to FIG. 6C are illustrative views showing a step of a method of forming the groove of the encasing layer of the first embodiment of the invention.
Figure 6B:
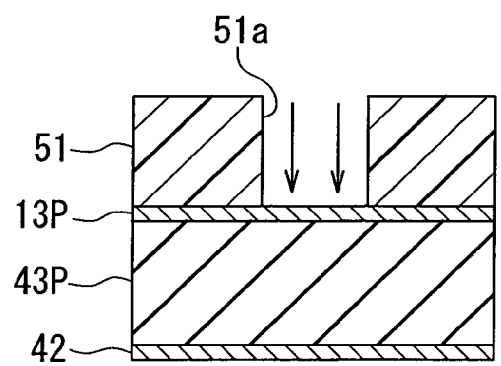
Figure 6C:
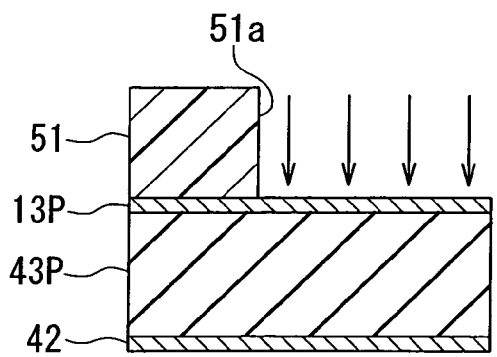

FIG. 6A to FIG. 6C show the next step. FIG. 6A is a top view of a stack of layers formed in the process of manufacture of the magnetic head. FIG. 6B is a cross-sectional view of the stack of FIG. 6A taken along line 6B-6B. FIG. 6C is a cross-sectional view of the stack of FIG. 6A taken along line 6C-6C. In this step, first, the bottom forming layer 42 is formed on the nonmagnetic layer 41. Next, a nonmagnetic layer 43P is formed on the bottom forming layer 42. The nonmagnetic layer 43P will undergo formation of the groove 43a therein later and will thereby become the encasing layer 43. Next, a nonmagnetic metal layer 13P is formed on the nonmagnetic layer 43P. The nonmagnetic metal layer 13P will undergo formation of the opening 13a therein later and will thereby become the groove defining layer 13.

Figure 7A:
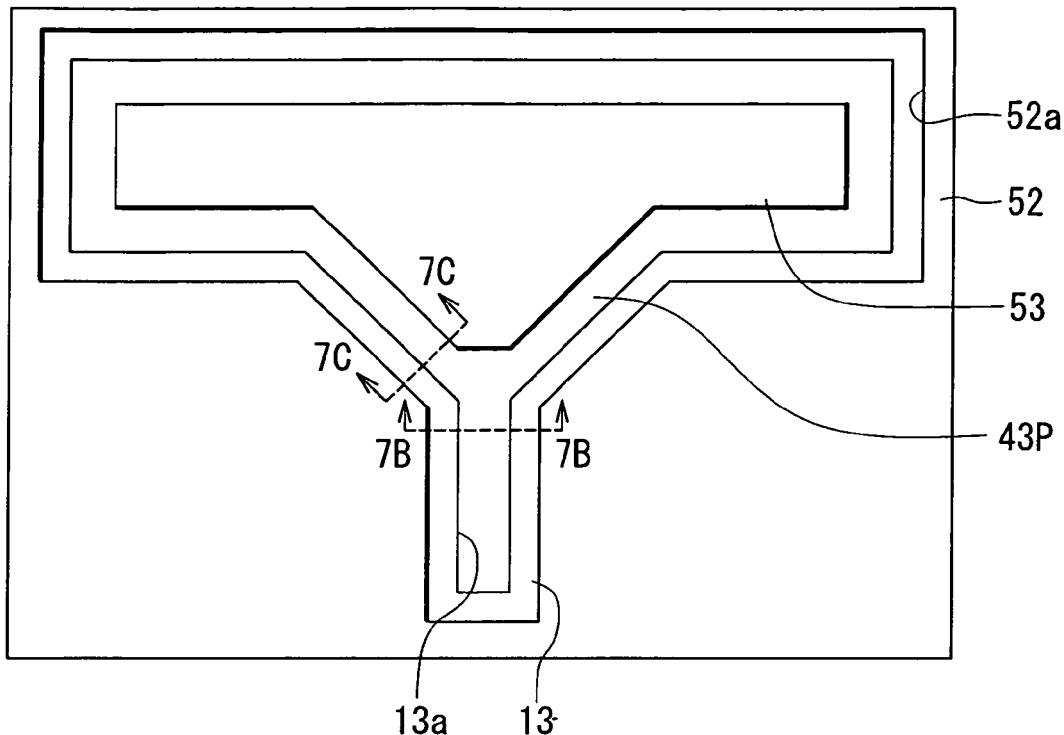
FIG. 7A to FIG. 7C are illustrative views showing a step that follows the step of FIG. 6A to FIG. 6C.
Figure 7B:
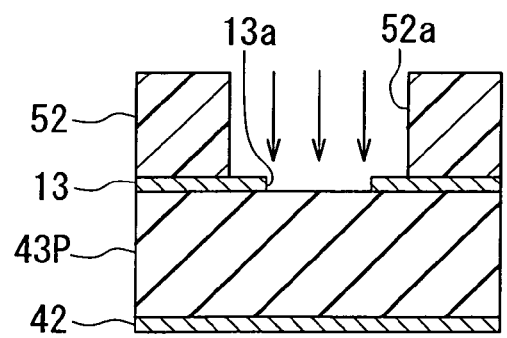
Figure 7C:
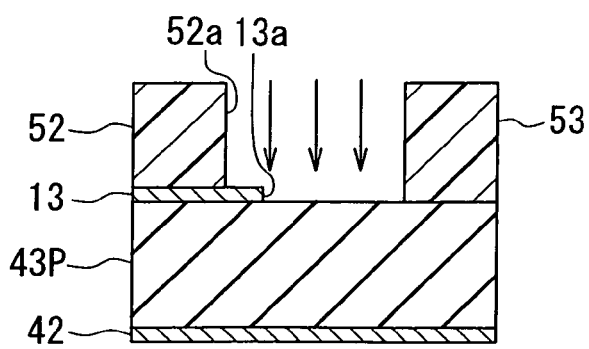

Next, a photoresist mask 51 to be used for forming the opening 13a in the nonmagnetic metal layer 13P is formed on the nonmagnetic metal layer 13P. The photoresist mask 51 has an opening 51a having a shape corresponding to the opening 13a and the groove 43a. The photoresist mask 51 is formed by patterning a photoresist layer by photolithography. Next, the nonmagnetic metal layer 13P is selectively etched using the photoresist mask 51, whereby the penetrating opening 13a is formed in the nonmagnetic metal layer 13P. This etching is performed by, for example, ion beam etching (hereinafter referred to as IBE). Next, the photoresist mask 51 is removed. FIG. 7A to FIG. 7C show the state in which the opening 13a has been formed in the nonmagnetic metal layer 13P.

FIG. 7A is a top view of a stack of layers formed in the process of manufacture of the magnetic head. FIG. 7B is a cross-sectional view of the stack of FIG. 7A taken along line 7B-7B. FIG. 7C is a cross-sectional view of the stack of FIG. 7A taken along line 7C-7C. As shown in FIG. 7A to FIG. 7C, the nonmagnetic metal layer 13P becomes the groove defining layer 13 as a result of the formation of the opening 13a.

Next, photoresist masks 52 and 53 are formed on the groove defining layer 13. The photoresist masks 52 and 53 are formed at the same time by patterning a photoresist layer by photolithography. The photoresist mask 52 has a penetrating opening 52a wider than the opening 13a of the groove defining layer 13, and is formed on the groove defining layer 13 such that the opening 13a is exposed from the opening 52a. The distance between the edge of the opening 13a and the edge of the opening 52a is preferably within a range of 0.1 to 0.3 µm. The photoresist mask 53 is formed into an island shape on the groove defining layer 13 in a region in which the second portion 43a2 of the groove 43a is to be formed, except a ring-like region near the edge of the opening 13a. The distance between the perimeter of the photoresist mask 53 and the edge of the opening 13a is preferably within a range of 0.1 to 1 µm.

Figure 8A:
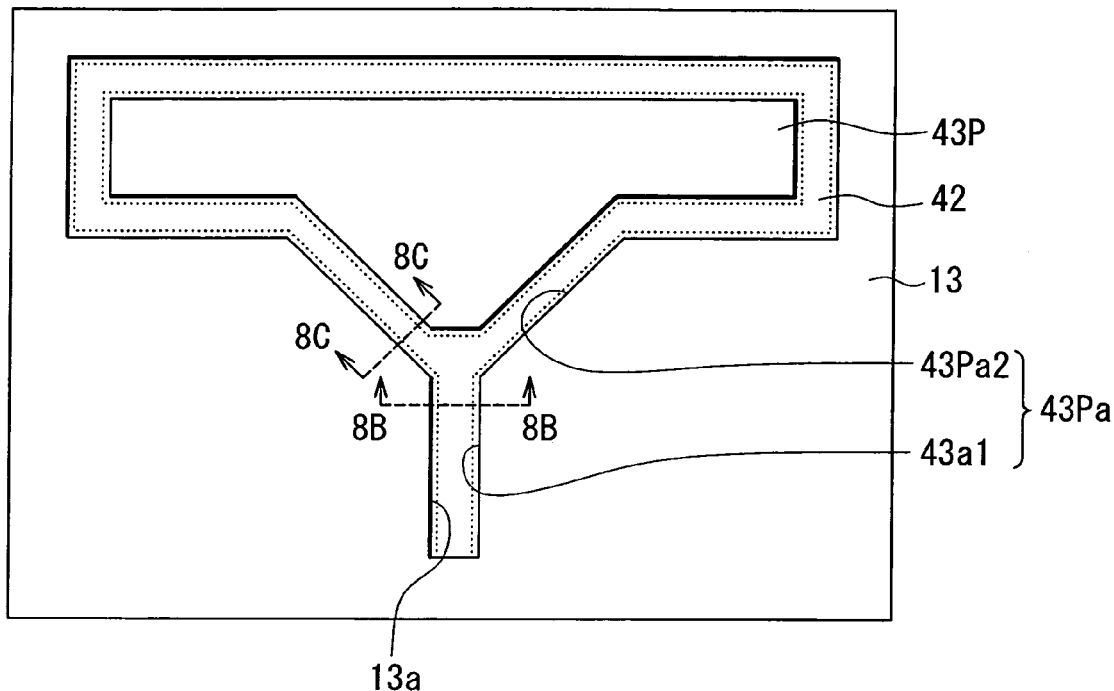
FIG. 8A to FIG. 8C are illustrative views showing a step that follows the step of FIG. 7A to FIG. 7C.
Figure 8B:
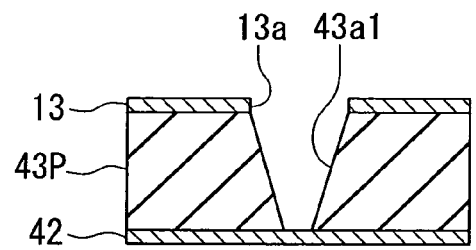
Figure 8C:
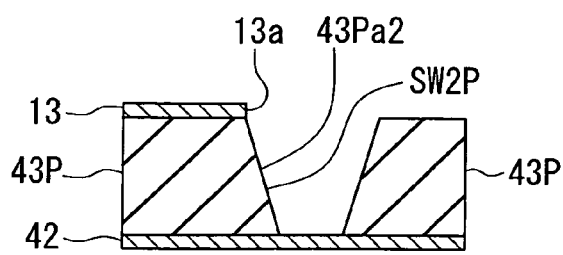

Next, the nonmagnetic layer 43P is taper-etched by reactive ion etching (hereinafter referred to as RIE), with the photoresist masks 52 and 53 and the groove defining layer 13 used as etching masks. This step will be called a first etching step. Next, the photoresist masks 52 and 53 are removed. FIG. 8A to FIG. 8C show the state after the removal of the photoresist masks 52 and 53.

FIG. 8A is a top view of a stack of layers formed in the process of manufacture of the magnetic head. FIG. 8B is a cross-sectional view of the stack of FIG. 8A taken along line 8B-8B. FIG. 8C is a cross-sectional view of the stack of FIG. 8A taken along line 8C-8C. As shown in FIG. 8A to FIG. 8C, the taper-etching of the nonmagnetic layer 43P results in formation of an initial groove 43Pa in the nonmagnetic layer 43P. In the case where the nonmagnetic layer 43P is made of alumina ($Al_2O_3$), an etching gas containing at least $BCl_3$ out of $BCl_3$ and $Cl_2$ and further containing $CF_4$ or $N_2$ is used for RIE to taper-etch the nonmagnetic layer 43P in the first etching step. $BCl_3$ and $Cl_2$ are main components that contribute to the etching of the nonmagnetic layer 43P. $CF_4$ and $N_2$ are gases for forming, during etching of the nonmagnetic layer 43P, a sidewall-protecting film on the sidewall of the groove formed by the etching. The etching gas containing $CF_4$ or $N_2$ serves to form the sidewall-protecting film on the sidewall of the groove during the etching of the nonmagnetic layer 43P, thereby serving to accomplish taper-etching of the nonmagnetic layer 43P.

The edge of the opening 13a of the groove defining layer 13 is located directly on the outer edge of the initial groove 43Pa located at the top surface of the nonmagnetic layer 43P. The initial groove 43Pa includes the first portion 43a1 of the groove 43a, and an initial sidewall forming portion 43Pa2. The initial sidewall forming portion 43Pa2 is formed in a ring-like region near the perimeter of the region in which the second portion 43a2 of the groove 43a is to be formed. After the first etching step, as shown in FIG. 8A to FIG. 8C, a portion of the nonmagnetic layer 43P, that is, the portion of the nonmagnetic layer 43P that was covered with the photoresist mask 53 in the first etching step, remains on the bottom forming layer 42 in a region that is inward relative to the initial sidewall forming portion 43Pa2. As shown in FIG. 8C, the initial sidewall forming portion 43Pa2 has an initial sidewall SW2P that will be etched in a second etching step to be performed later and will thereby become the sidewall SW2 of the second portion 43a2.

Figure 9A:
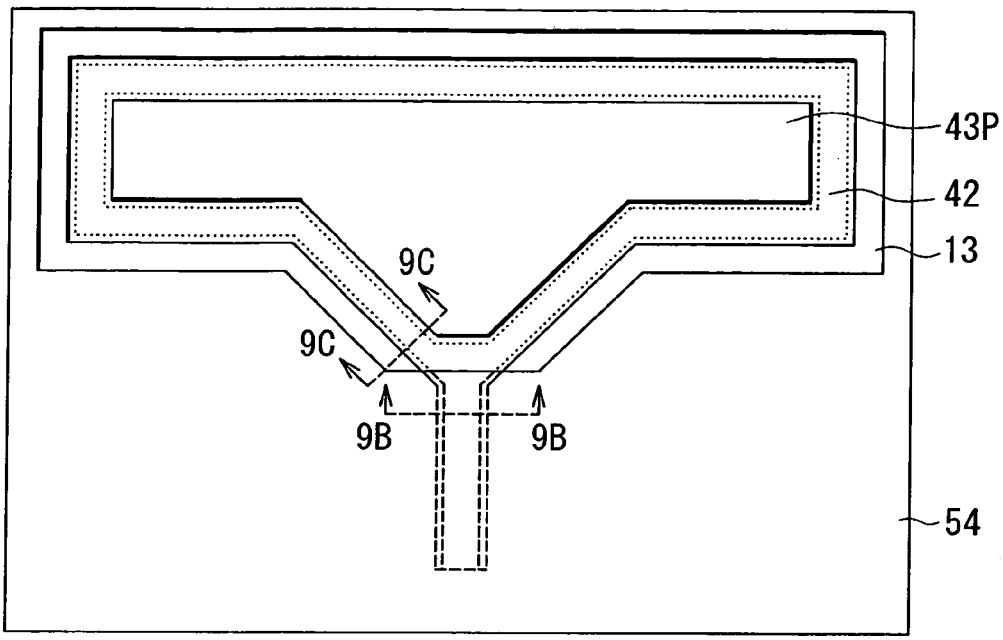
FIG. 9A to FIG. 9C are illustrative views showing a step that follows the step of FIG. 8A to FIG. 8C.
Figure 9B:
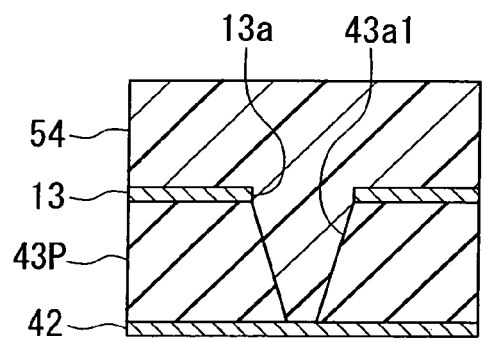
Figure 9C:
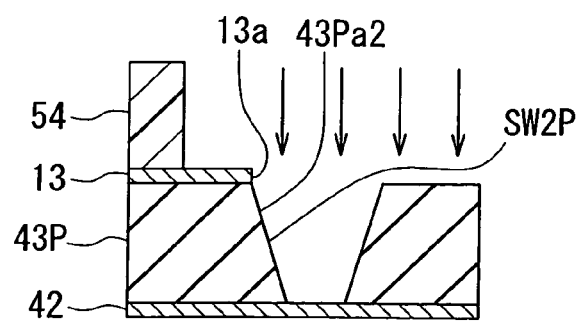
Figure 10A:
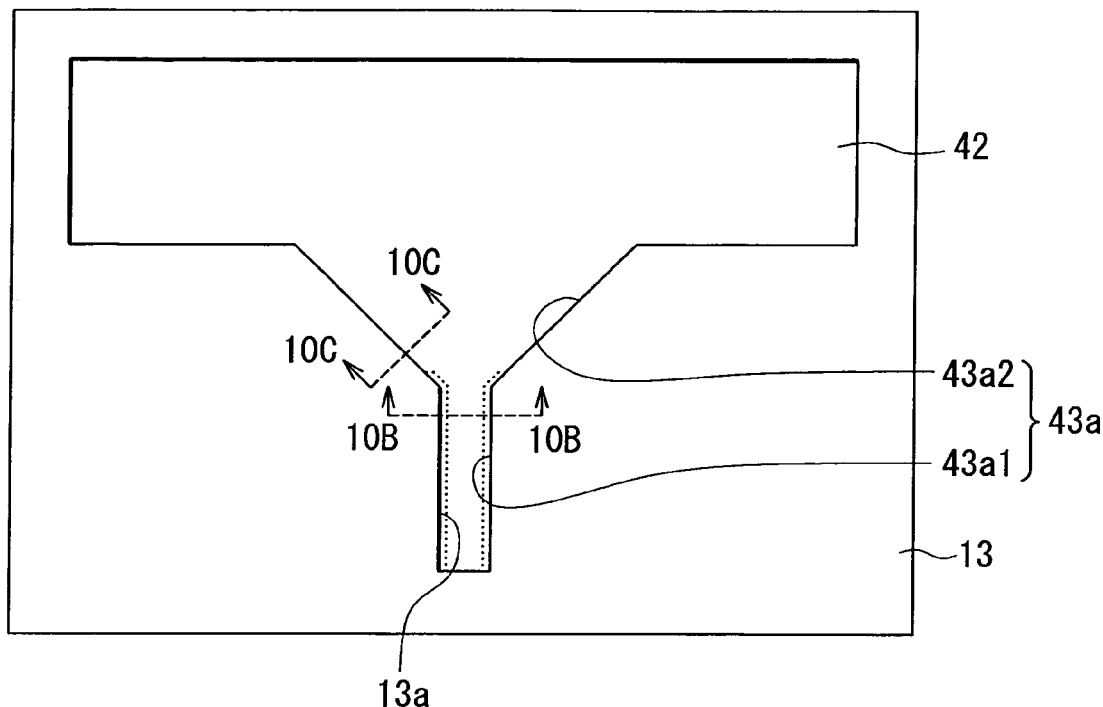
FIG. 10A to FIG. 10C are illustrative views showing a step that follows the step of FIG. 9A to FIG. 9C.
Figure 10B:
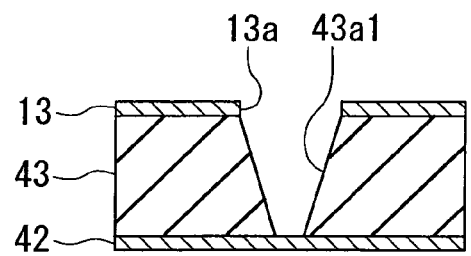
Figure 10C:
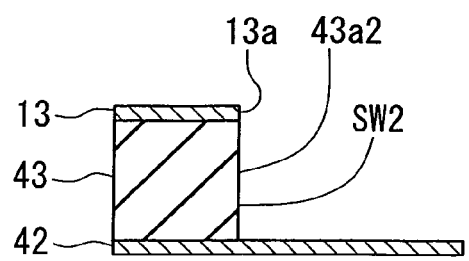

FIG. 9A to FIG. 9C show the next step. FIG. 9A is a top view of a stack of layers formed in the process of manufacture of the magnetic head. FIG. 9B is a cross-sectional view of the stack of FIG. 9A taken along line 9B-9B. FIG. 9C is a cross-sectional view of the stack of FIG. 9A taken along line 9C-9C. In this step, first formed is an initial groove mask 54 that covers the first portion 43a1 of the initial groove 43Pa. The initial groove mask 54 is formed by patterning a photoresist layer by photolithography. Next, the nonmagnetic layer 43P is etched by RIE with the initial groove mask 54 and the groove defining layer 13 used as an etching mask. This step will be called the second etching step. Next, the initial groove mask 54 is removed. FIG. 10A to FIG. 10C show the state after the removal of the initial groove mask 54.

FIG. 10A is a top view of a stack of layers formed in the process of manufacture of the magnetic head. FIG. 10B is a cross-sectional view of the stack of FIG. 10A taken along line 10B-10B. FIG. 10C is a cross-sectional view of the stack of FIG. 10A taken along line 10C-10C. As shown in FIG. 10A to FIG. 10C, the groove 43a is completed by the second etching step. As a result of completion of the groove 43a, the nonmagnetic layer 43P becomes the encasing layer 43.

In the second etching step, the initial sidewall SW2P is etched to thereby form the sidewall SW2 of the second portion 43a2, and the portion of the nonmagnetic layer 43P remaining on the bottom forming layer 42 in the region inward relative to the initial sidewall forming portion 43Pa2 is removed by etching. As shown in FIG. 9C and FIG. 10C, in the second etching step, the initial sidewall SW2P is etched so that the angle formed by the sidewall SW2 of the second portion 43a2 with respect to the direction perpendicular to the top surface of the substrate 1 will be smaller than the angle formed by the initial sidewall SW2P with respect to the direction perpendicular to the top surface of the substrate 1. Furthermore, in the second etching step, an etching gas containing $BCl_3$ and $Cl_2$, for example, is used for RIE to etch the nonmagnetic layer 43P.

Process steps subsequent to the completion of the groove 43a will be described with reference to FIG. 1 and FIG. 2. Subsequent to the completion of the groove 43a, first, the nonmagnetic film 14 is formed over the entire top surface of the stack shown in FIG. 10A to FIG. 10C. The nonmagnetic film 14 is also formed in the groove 43a. The nonmagnetic film 14 is formed by sputtering or chemical vapor deposition (hereinafter referred to as CVD), for example. The thickness of the nonmagnetic film 14 is precisely controllable. In the case of forming the nonmagnetic film 14 by CVD, it is preferred to employ, in particular, so-called atomic layer CVD (hereinafter referred to as ALCVD) in which formation of a single atomic layer is repeated. In this case, it is possible to control the thickness of the nonmagnetic film 14 with higher precision. In the case of forming the nonmagnetic film 14 by ALCVD, it is preferable to use alumina, in particular, as the material of the nonmagnetic film 14. In the case of using a semiconductor material to form the nonmagnetic film 14, it is preferred that the nonmagnetic film 14 be formed by ALCVD at low temperatures (around 200° C.) or by low-pressure CVD at low temperatures. The semiconductor material for use as the material of the nonmagnetic film 14 is preferably undoped polycrystalline silicon or amorphous silicon.

Next, the polishing stopper layer 15 is formed over the entire top surface of the stack by, for example, sputtering or ALCVD. The polishing stopper layer 15 is also formed in the groove 43a. The polishing stopper layer 15 indicates the level where to stop polishing in a polishing step to be performed later.

Next, a magnetic layer (not shown) that will become the pole layer 16 later is formed. This magnetic layer is formed such that the top surface thereof is located higher than the top surfaces of the groove defining layer 13, the nonmagnetic film 14 and the polishing stopper layer 15. The magnetic layer may be formed by frame plating or by making an unpatterned plating layer and then patterning the plating layer through etching.

Next, a coating layer made of, for example, alumina, is formed over the entire top surface of the stack. Next, the coating layer and the magnetic layer are polished by, for example, CMP, until the polishing stopper layer 15 becomes exposed, and the top surfaces of the polishing stopper layer 15 and the magnetic layer are thereby planarized. When CMP is employed to polish the coating layer and the magnetic layer, such a slurry is used that polishing is stopped when the polishing stopper layer 15 becomes exposed, such as an alumina-base slurry.

Next, a portion of the polishing stopper layer 15 exposed at the top surface of the stack is selectively removed by RIE or IBE, for example. Next the nonmagnetic film 14, the polishing stopper layer 15 and the magnetic layer are polished by, for example, CMP, until the groove defining layer 13 becomes exposed, and the top surfaces of the groove defining layer 13, the nonmagnetic film 14, the polishing stopper layer 15 and the magnetic layer are thereby planarized. As a result, the remainder of the magnetic layer becomes the pole layer 16. When CMP is employed to polish the nonmagnetic film 14, the polishing stopper layer 15 and the magnetic layer, such a slurry is used that polishing is stopped when the groove defining layer 13 becomes exposed, such as an alumina-base slurry. It is possible to control the thickness of the pole layer 16 with precision by stopping the polishing when the groove defining layer 13 becomes exposed, as thus described.

Next, the gap layer 18 is formed over the entire top surface of the stack. The gap layer 18 is formed by sputtering or CVD, for example. In the case of forming the gap layer 18 by CVD, it is preferred to employ ALCVD, in particular. In the case of forming the gap layer 18 by ALCVD, it is preferred to use alumina, in particular, as the material of the gap layer 18.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching this magnetic layer. Next, the nonmagnetic layer 21 is formed over the entire top surface of the stack. Next, the nonmagnetic layer 21 is polished by, for example, CMP, until the first layer 20A and the yoke layer 20B become exposed, and the top surfaces of the first layer 20A, the yoke layer 20B and the nonmagnetic layer 21 are thereby planarized.

Next, the insulating layer 22 is formed on regions of the top surfaces of the yoke layer 20B and the nonmagnetic layer 21 above which the coil 23 is to be disposed. Next, the coil 23 is formed by, for example, frame plating, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of, for example, photoresist, is selectively formed around the coil 23 and in the space between the respective adjacent turns of the coil 23. Next, the insulating layer 25 is formed over the entire top surface of the stack. Next, the insulating layer 25 is polished by, for example, CMP, until the second layer 20C, the coupling layer 20D and the coil 23 become exposed, and the top surfaces of the second layer 20C, the coupling layer 20D, the coil 23, and the insulating layers 24 and 25 are thereby planarized.

Next, the insulating layer 26 is formed on the coil 23 and the insulating layers 24 and 25. Next, the third layer 20E is formed by frame plating, for example. The shield 20 is thus completed.

Next, the protection layer 27 is formed to cover the entire top surface of the stack. Wiring, terminals and so on are then formed on the protection layer 27, the substrate is cut into sliders, and processes including lapping of the medium facing surface 30 and fabrication of flying rails are performed to thereby complete the magnetic head.

The functions and effects of the magnetic head of the present embodiment will now be described. In the magnetic head, the write head writes data on a recording medium while the read head reads data written on the recording medium. In the write head, the coil 23 generates a magnetic field that corresponds to data to be written on the recording medium. The pole layer 16 and the shield 20 form a magnetic path for passing a magnetic flux corresponding to the magnetic field generated by the coil 23. The pole layer 16 allows the magnetic flux corresponding to the magnetic field generated by the coil 23 to pass, and generates a write magnetic field used for writing the data on the recording medium by means of the perpendicular magnetic recording system. The shield 20 takes in a disturbance magnetic field applied from outside the magnetic head to the magnetic head. It is thereby possible to prevent erroneous writing on the recording medium caused by the disturbance magnetic field intensively taken into the pole layer 16. The shield 20 also has a function of returning a magnetic flux that has been generated from the end face of the pole layer 16 (the track width defining portion 16A) located in the medium facing surface 30 and that has magnetized the recording medium.

According to the present embodiment, in the medium facing surface 30, the end face of the shield 20 is located forward of the end face of the pole layer 16 along the direction T of travel of the recording medium (that is, located closer to the air outflow end of the slider), with a specific small distance provided therebetween by the gap layer 18. The position of an end of the bit pattern to be written on the recording medium is determined by the position of the end of the pole layer 16 that is closer to the gap layer 18 and located in the medium facing surface 30. The shield 20 takes in a magnetic flux that is generated from the end face of the pole layer 16 located in the medium facing surface 30 and that expands in directions except the direction perpendicular to the plane of the recording medium, so as to prevent this flux from reaching the recording medium. It is thereby possible to prevent a direction of magnetization of the bit pattern already written on the recording medium from being changed due to the effect of the above-mentioned flux. The present embodiment thereby makes it possible to improve linear recording density.

According to the present embodiment, as shown in FIG. 4, the end face of the track width defining portion 16A located in the medium facing surface 30 has a width that decreases with decreasing distance from the first side A1, that is, with decreasing distance from the top surface of the substrate 1. This makes it possible to prevent the problems resulting from the skew.

In the present embodiment, the pole layer 16 is disposed in the groove 43a of the encasing layer 43 made of a nonmagnetic material, with the nonmagnetic film 14 and the polishing stopper layer 15 disposed between the pole layer 16 and the groove 43a. The width of the pole layer 16 is therefore smaller than that of the groove 43a. This makes it easy to form the groove 43a and to reduce the width of the pole layer 16 and the width of the top surface of the track width defining portion 16A that defines the track width, in particular. As a result, according to the embodiment, it is possible to easily implement a track width that is smaller than the minimum track width that can be formed by photolithography, and to control the track width with accuracy.

In the present embodiment, the pole layer 16 has: the first and second side surfaces S1 and S2 located opposite to each other in the first region R1 that extends from the medium facing surface 30 to the position 10 to 300 nm away from the medium facing surface 30; and the third and fourth side surfaces S3 and S4 located in the second region R2 other than the first region R1. The distance between the first side surface S1 and the second side surface S2 taken in the track width direction decreases with decreasing distance from the top surface of the substrate 1. The angle formed by the third side surface S3 with respect to the direction perpendicular to the top surface of the substrate 1 is smaller than the angle formed by the first side surface S1 with respect to the direction perpendicular to the top surface of the substrate 1. The angle formed by the fourth side surface S4 with respect to the direction perpendicular to the top surface of the substrate 1 is smaller than the angle formed by the second side surface S2 with respect to the direction perpendicular to the top surface of the substrate 1. According to the present embodiment, the area of the cross section of the wide portion 16B of the pole layer 16 perpendicular to the direction in which magnetic flux flows is greater as compared with a case in which the angle formed by the third side surface S3 with respect to the direction perpendicular to the top surface of the substrate 1 is equal to the angle formed by the first side surface Si with respect to the direction perpendicular to the top surface of the substrate 1, and the angle formed by the fourth side surface S4 with respect to the direction perpendicular to the top surface of the substrate 1 is equal to the angle formed by the second side surface S2 with respect to the direction perpendicular to the top surface of the substrate 1. Consequently, the present embodiment makes it possible to allow a magnetic flux of greater magnitude to pass through the portion near the boundary between the track width defining portion 16A and the wide portion 16B, in particular, thereby making it possible to improve the write characteristics such as overwrite property. Furthermore, according to the present embodiment, since it is unnecessary to extremely reduce the neck height in order to improve the write characteristics, it becomes possible to precisely define the track width by allowing a great neck height.

A description will now be given on the advantageous effects of the groove-forming method of the present embodiment in comparison with a groove-forming method of a comparative example. Reference is now made to FIG. 11A to FIG. 14C to describe the groove-forming method of the comparative example. The groove-forming method of the comparative example is the same as that of the present embodiment up to the step of forming the penetrating opening 13a in the nonmagnetic metal layer 13P. The nonmagnetic metal layer 13P becomes the groove defining layer 13 as a result of the formation of the opening 13a.

Figure 11A:
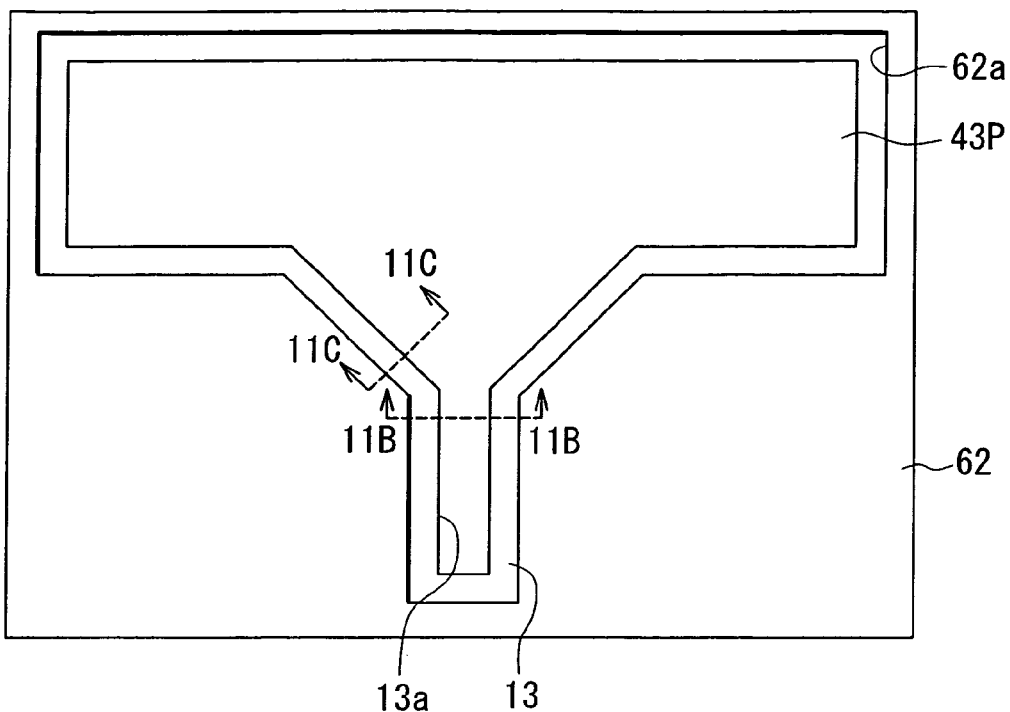
FIG. 11A to FIG. 11C are illustrative views showing a step of a groove-forming method of a comparative example.
Figure 11B:
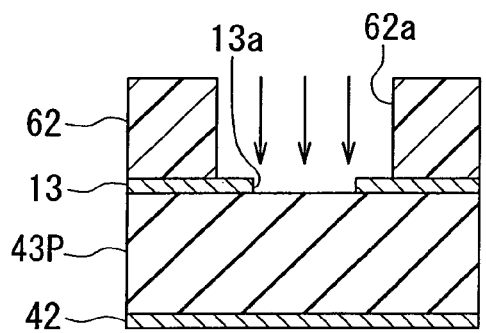
Figure 11C:
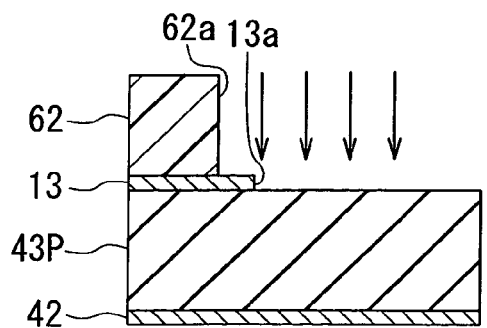

FIG. 11A to FIG. 11C show the next step. FIG. 11A is a top view of a stack of layers formed in the process of manufacture of the magnetic head. FIG. 11B is a cross-sectional view of the stack of FIG. 11A taken along line 11B-11B. FIG. 11C is a cross-sectional view of the stack of FIG. 11A taken along line 11C-11C. In this step, first, a photoresist mask 62 is formed on the groove defining layer 13. The photoresist mask 62 is formed by patterning a photoresist layer by photolithography. The photoresist mask 62 has a penetrating opening 62a wider than the opening 13a of the groove defining layer 13, and is formed on the groove defining layer 13 such that the opening 13a is exposed from the opening 62a.

Figure 12A:
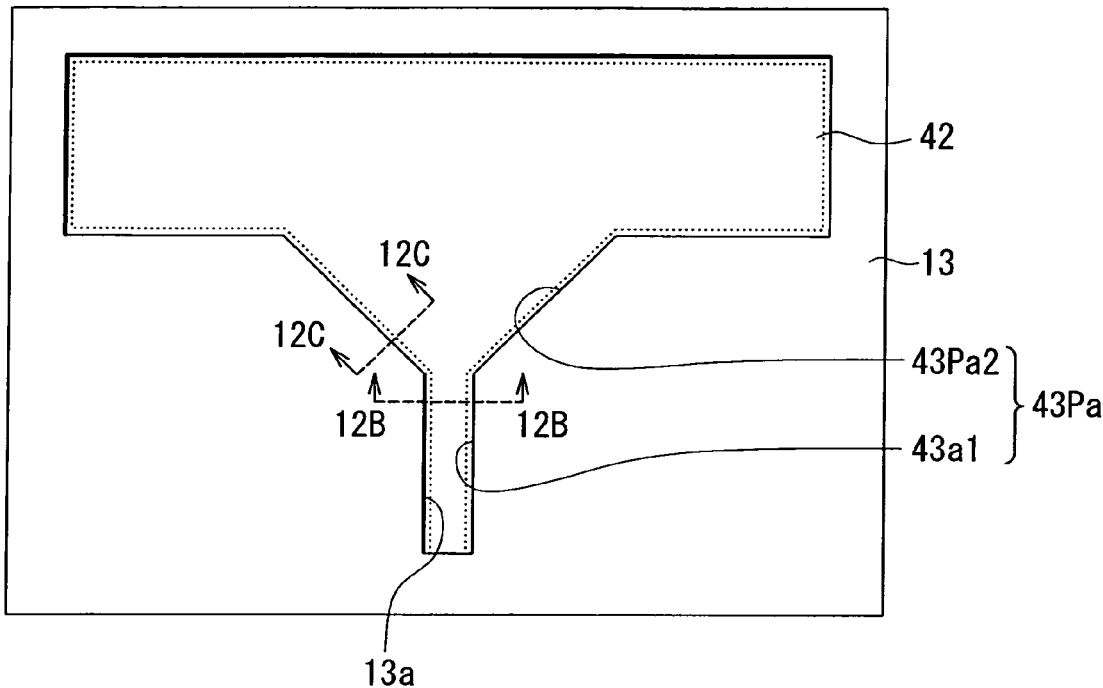
FIG. 12A to FIG. 12C are illustrative views showing a step that follows the step of FIG. 11A to FIG. 11C.
Figure 12B:
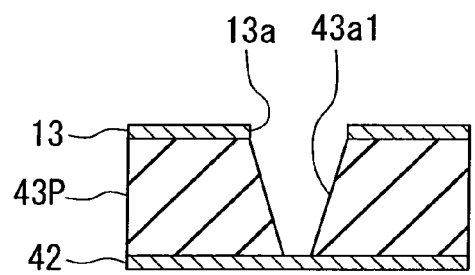
Figure 12C:
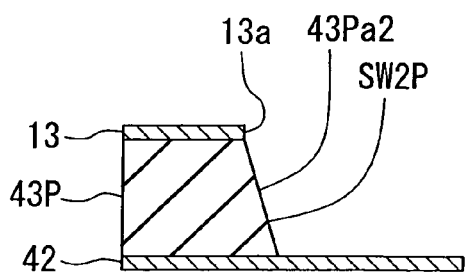

Next, the nonmagnetic layer 43P is taper-etched by RIE with the photoresist mask 62 and the groove defining layer 13 used as an etching mask. This step will be called a first etching step. Next, the photoresist mask 62 is removed. FIG. 12A to FIG. 12C show the state after the removal of the photoresist mask 62.

FIG. 12A is a top view of a stack of layers formed in the process of manufacture of the magnetic head. FIG. 12B is a cross-sectional view of the stack of FIG. 12A taken along line 12B-12B. FIG. 12C is a cross-sectional view of the stack of FIG. 12A taken along line 12C- 12C. As shown in FIG. 12A to FIG. 12C, the taper-etching of the nonmagnetic layer 43P results in formation of an initial groove 43Pa in the nonmagnetic layer 43P.

The edge of the opening 13a of the groove defining layer 13 is located directly on the edge of the initial groove 43Pa located at the top surface of the nonmagnetic layer 43P. The initial groove 43Pa includes the first portion 43a1 of the groove 43a, and an initial sidewall forming portion 43Pa2. The initial sidewall forming portion 43Pa2 of the comparative example is formed in the entire region in which the second portion 43a2 of the groove 43a is to be formed, not in the ring-like region as in the case of the initial sidewall forming portion 43Pa2 of the embodiment. As shown in FIG. 12C, the initial sidewall forming portion 43Pa2 has an initial sidewall SW2P that will be etched in a second etching step to be performed later and will thereby become the sidewall SW2 of the second portion 43a2. In the comparative example, the top surface of the bottom forming layer 42 is exposed in the entire region surrounded by the initial sidewall SW2P.

Figure 13A:
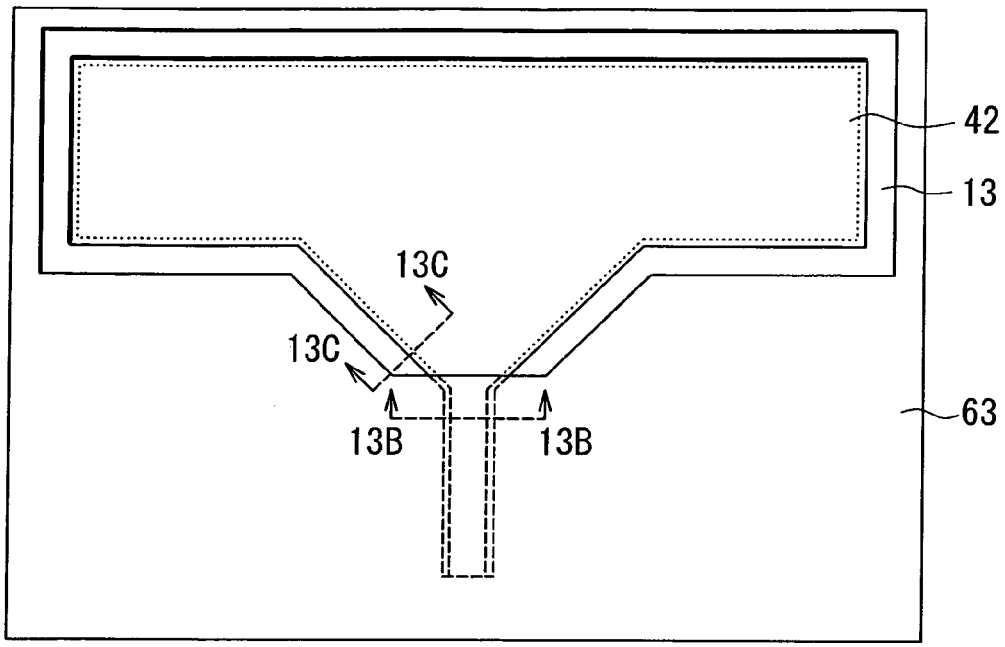
FIG. 13A to FIG. 13C are illustrative views showing a step that follows the step of FIG. 12A to FIG. 12C.
Figure 13B:
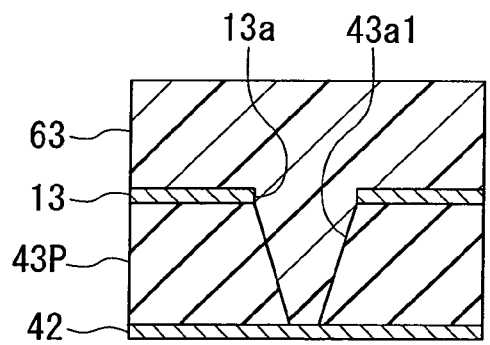
Figure 13C:
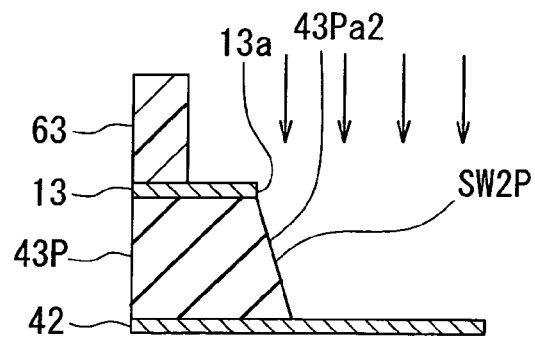
Figure 14A:
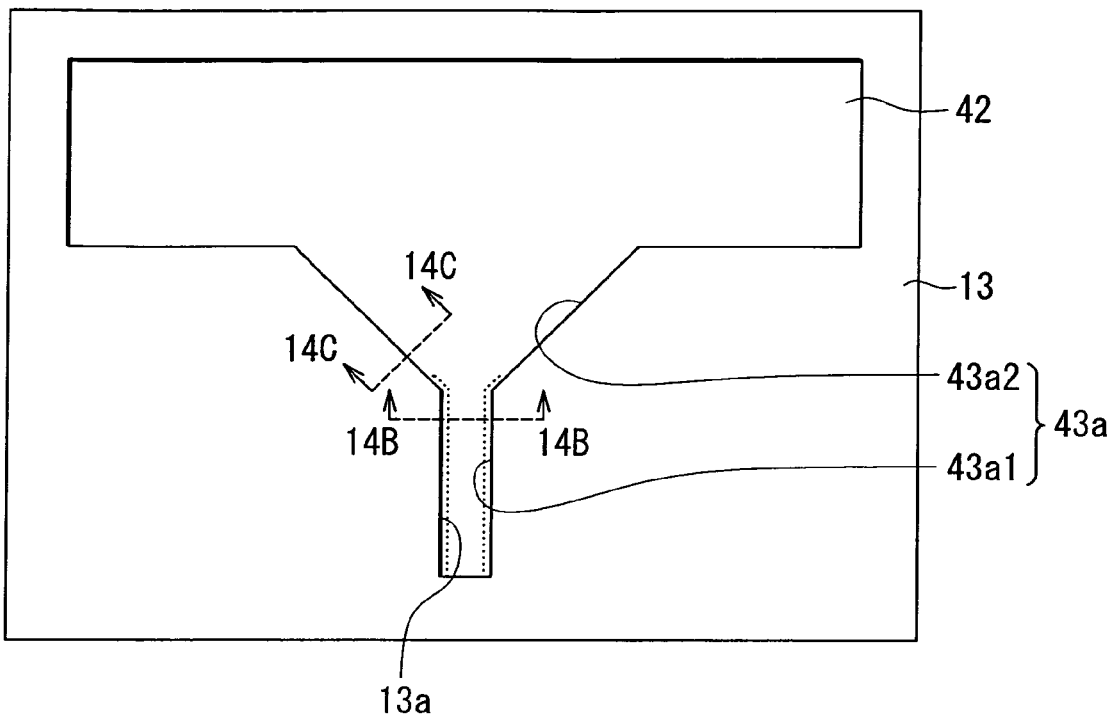
FIG. 14A to FIG. 14C are illustrative views showing a step that follows the step of FIG. 13A to FIG. 13C.
Figure 14B:
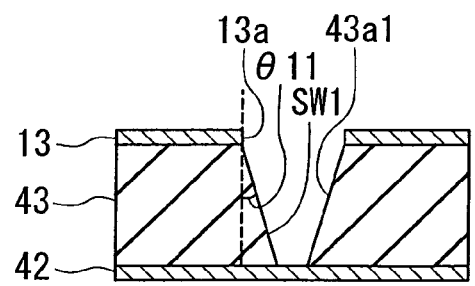
Figure 14C:
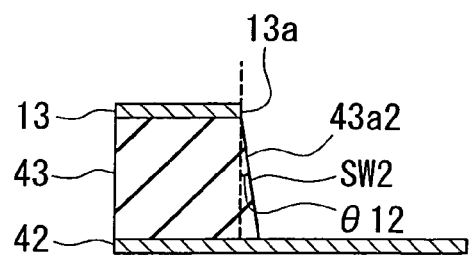

FIG. 13A to FIG. 13C show the next step. FIG. 13A is a top view of a stack of layers formed in the process of manufacture of the magnetic head. FIG. 13B is a cross-sectional view of the stack of FIG. 13A taken along line 13B-13B. FIG. 13C is a cross-sectional view of the stack of FIG. 13A taken along line 13C-13C. In this step, first formed is an initial groove mask 63 that covers the first portion 43a1 of the initial groove 43Pa. The initial groove mask 63 is formed by patterning a photoresist layer by photolithography. Next, the nonmagnetic layer 43P is etched by RIE with the initial groove mask 63 and the groove defining layer 13 used as an etching mask. This step will be called the second etching step. Next, the initial groove mask 63 is removed. FIG. 14A to FIG. 14C show the state after the removal of the initial groove mask 63.

FIG. 14A is a top view of a stack of layers formed in the process of manufacture of the magnetic head. FIG. 14B is a cross-sectional view of the stack of FIG. 14A taken along line 14B-14B. FIG. 14C is a cross-sectional view of the stack of FIG. 14A taken along line 14C-14C. As shown in FIG. 14A to FIG. 14C, the groove 43a is completed by the second etching step. In the second etching step, the initial sidewall SW2P is etched to thereby form the sidewall SW2 of the second portion 43a2. As shown in FIG. 13C and FIG. 14C, in the second etching step, the initial sidewall SW2P is etched so that the angle formed by the sidewall SW2 of the second portion 43a2 with respect to the direction perpendicular to the top surface of the substrate 1 will be smaller than the angle formed by the initial sidewall SW2P with respect to the direction perpendicular to the top surface of the substrate 1.

Here, as shown in FIG. 14B, $\theta 11$ represents the angle formed by the sidewall SW1 of the first portion 43a1 of the comparative example with respect to the direction perpendicular to the top surface of the substrate 1. The angle $\theta 11$ is within a range of, for example, 8 to 15 degrees, like the angle $\theta 1$ of the present embodiment. Furthermore, as shown in FIG. 14C, $\theta 12$ represents the angle formed by the sidewall SW2 of the second portion 43a2 of the comparative example with respect to the direction perpendicular to the top surface of the substrate 1. The angle $\theta 12$ is smaller than the angle $\theta 11$, but greater than the angle $\theta 2$ of the present embodiment. The angle $\theta 12$ is within a range of, for example, 6.5 to 10 degrees.

As described above, according to the comparative example, the angle $\theta 12$ is relatively great. The reason for this is as follows. According to the comparative example, the top surface of the bottom forming layer 42 is exposed in the entire region surrounded by the initial sidewall SW2P. As a result, during the second etching step, a larger amount of substances fly off due to etching of the bottom forming layer 42, so that a larger amount of reaction product is generated due to those substances. The reaction product adheres to the sidewall SW2 of the second portion 43a2 of the groove 43a, and thereby forms a sidewall-protecting film. The angle $\theta 12$ becomes relatively great due to the formation of the sidewall-protecting film. Consequently, according to the comparative example, the area of the cross section of the wide portion 16B of the pole layer 16 perpendicular to the direction in which magnetic flux flows cannot be made sufficiently great, and as a result, it is not possible to satisfactorily improve the write characteristics such as overwrite property.

In contrast, according to the present embodiment, a portion of the top surface of the bottom forming layer 42 located inward relative to the initial sidewall forming portion 43Pa2 of the initial groove 43Pa is covered with the nonmagnetic layer 43P when the second etching step starts. Consequently, according to the present embodiment, it is possible to suppress formation of the sidewall-protecting film on the sidewall SW2 of the second portion 43a2 of the groove 43a caused by the substances flying off due to etching of the bottom forming layer 42 during the second etching step. This serves to prevent an increase in the angle formed by the sidewall SW2 with respect to the direction perpendicular to the top surface of the substrate 1. As a result, according to the present embodiment, the advantageous effects of being capable of preventing the problems resulting from the skew, capable of defining the track width with precision and capable of improving the write characteristics are exerted more remarkably.

Second Embodiment

A description will now be given on a manufacturing method for a magnetic head of a second embodiment of the invention. The manufacturing method for the magnetic head of the second embodiment is the same as that of the embodiment up to the step of forming the penetrating opening 13a in the nonmagnetic metal layer 13P. The nonmagnetic metal layer 13P becomes the groove defining layer 13 as a result of the formation of the opening 13a.

Figure 15A:
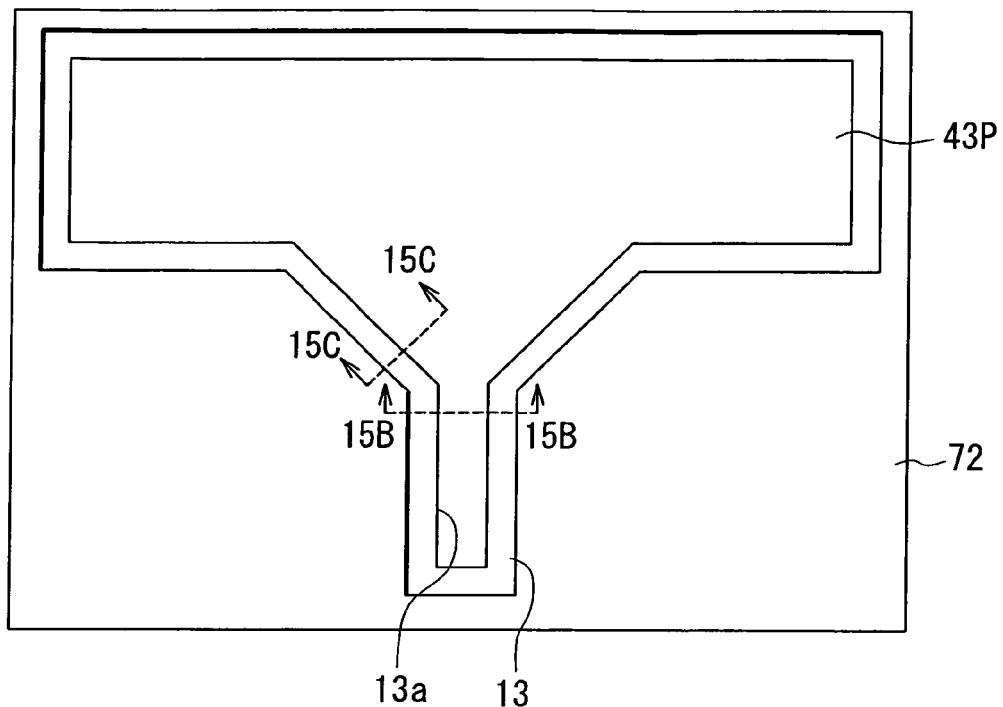
FIG. 15A to FIG. 15C are illustrative views showing a step of a method of forming the groove of the encasing layer of a second embodiment of the invention.
Figure 15B:
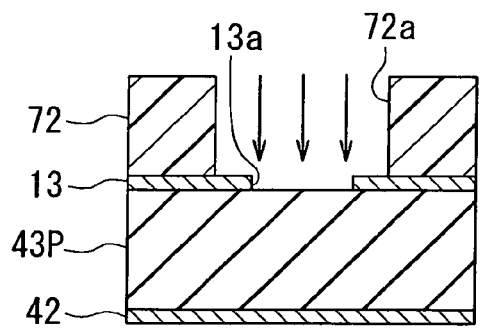
Figure 15C:
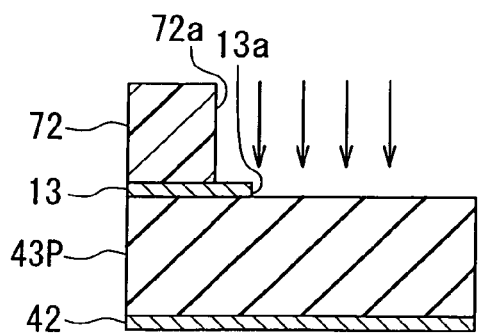

FIG. 15A to FIG. 15C show the next step. FIG. 15A is a top view of a stack of layers formed in the process of manufacture of the magnetic head. FIG. 15B is a cross-sectional view of the stack of FIG. 15A taken along line 15B-15B. FIG. 15C is a cross-sectional view of the stack of FIG. 15A taken along line 15C-15C. In this step, first, a photoresist mask 72 is formed on the groove defining layer 13. The photoresist mask 72 is formed by patterning a photoresist layer by photolithography. The photoresist mask 72 has a penetrating opening 72a wider than the opening 13a of the groove defining layer 13, and is formed on the groove defining layer 13 such that the opening 13a is exposed from the opening 72a. The shape of the photoresist mask 72 is the same as that of the photoresist mask 52 of the first embodiment.

Figure 16A:
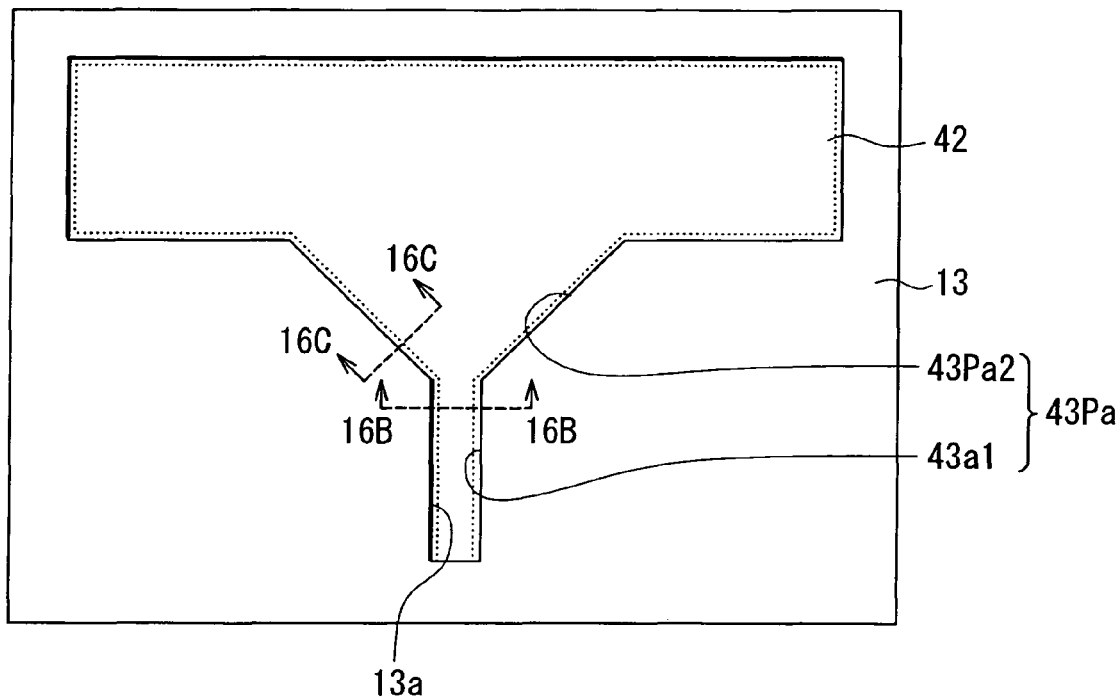
FIG. 16A to FIG. 16C are illustrative views showing a step that follows the step of FIG. 15A to FIG. 15C.
Figure 16B:
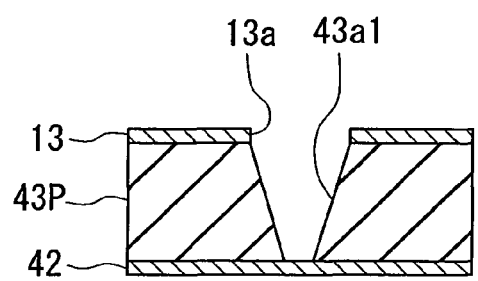
Figure 16C:
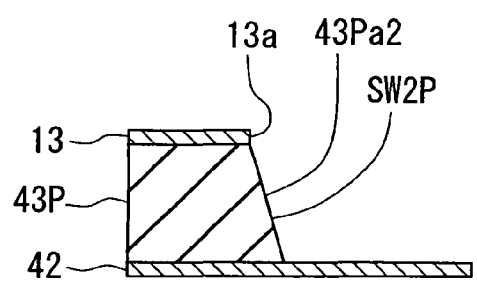

Next, the nonmagnetic layer 43P is taper-etched by RIE with the photoresist mask 72 and the groove defining layer 13 used as an etching mask. This step will be called a first etching step. Next, the photoresist mask 72 is removed. FIG. 16A to FIG. 16C show the state after the removal of the photoresist mask 72.

FIG. 16A is a top view of a stack of layers formed in the process of manufacture of the magnetic head. FIG. 16B is a cross-sectional view of the stack of FIG. 16A taken along line 16B-16B. FIG. 16C is a cross-sectional view of the stack of FIG. 16A taken along line 16C-16C. As shown in FIG. 16A to FIG. 16C, the taper-etching of the nonmagnetic layer 43P results in formation of an initial groove 43Pa in the nonmagnetic layer 43P. The conditions for RIE of the first etching step are the same as those of the first embodiment.

The edge of the opening 13a of the groove defining layer 13 is located directly on the edge of the initial groove 43Pa located at the top surface of the nonmagnetic layer 43P. The initial groove 43Pa includes the first portion 43a1 of the groove 43a, and an initial sidewall forming portion 43Pa2. The initial sidewall forming portion 43Pa2 has an initial sidewall SW2P that will be etched in a second etching step to be performed later and will thereby become the sidewall SW2 of the second portion 43a2. In the present embodiment, the top surface of the bottom forming layer 42 is exposed in the entire region surrounded by the initial sidewall SW2P.

Figure 17A:
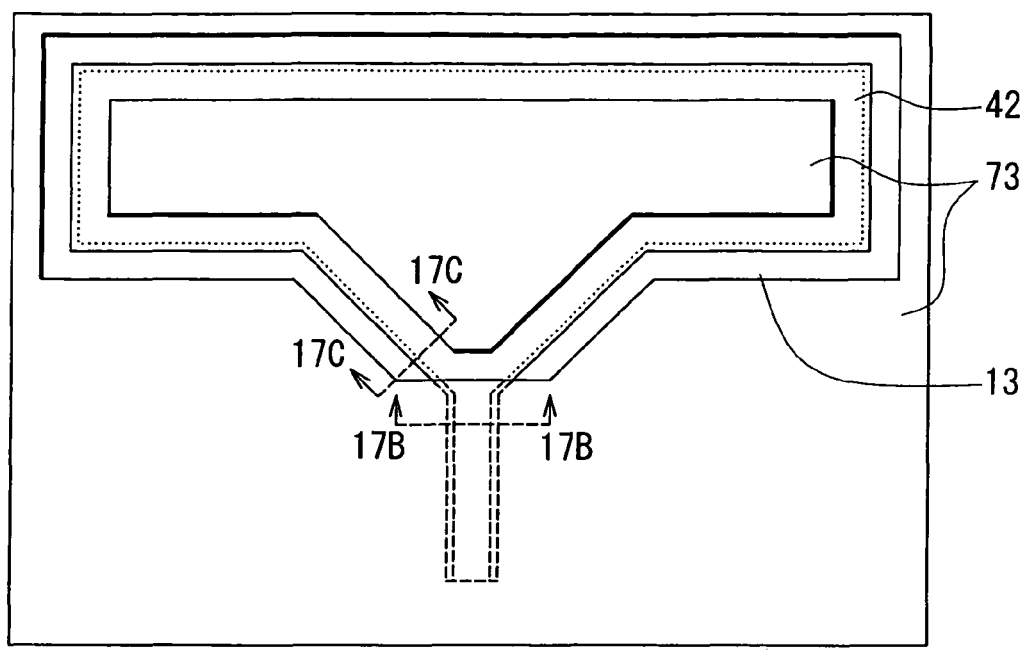
FIG. 17A to FIG. 17C are illustrative views showing a step that follows the step of FIG. 16A to FIG. 16C.
Figure 17B:
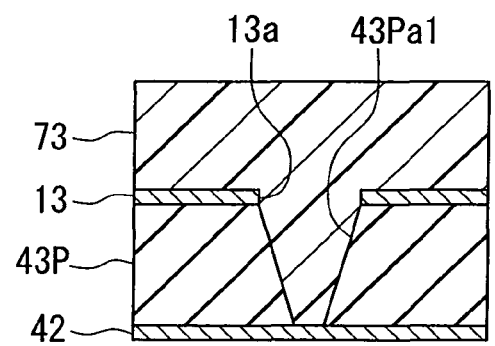
Figure 17C:
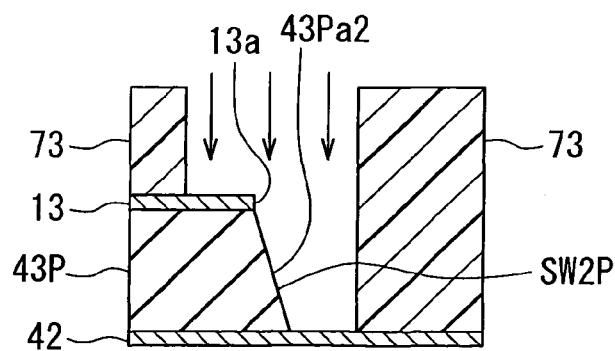

FIG. 17A to FIG. 17C show the next step. FIG. 17A is a top view of a stack of layers formed in the process of manufacture of the magnetic head. FIG. 17B is a cross-sectional view of the stack of FIG. 17A taken along line 17B-17B. FIG. 17C is a cross-sectional view of the stack of FIG. 17A taken along line 17C-17C. In this step, an initial groove mask 73 is first formed. The initial groove mask 73 covers the first portion 43a1 of the initial groove 43Pa. In the present embodiment, the initial groove mask 73 further covers a portion of the top surface of the bottom forming layer 42 exposed by the initial groove 43Pa within a region in which the second portion 43a2 of the groove 43a is to be formed. Specifically, the initial groove mask 73 covers the top surface of the bottom forming layer 42 in the region in which the second portion 43a2 of the groove 43a is to be formed, except a ring-like region near the initial sidewall SW2P. The top surface of the bottom forming layer 42 is exposed in the ring-like region near the initial sidewall SW2P. The initial groove mask 73 is formed by patterning a photoresist layer by photolithography.

Next, the nonmagnetic layer 43P is etched by RIE with the initial groove mask 73 and the groove defining layer 13 used as etching masks. This step will be called the second etching step. The conditions for RIE of the second etching step are the same as those of the first embodiment. In the second etching step, the initial sidewall SW2P is etched to thereby form the sidewall SW2 of the second portion 43a2. The groove 43a is completed by the second etching step. Next, the initial groove mask 73 is removed. The state after the removal of the initial groove mask 73 is as shown in FIG. 10A to FIG. 10C, as in the first embodiment. The steps that follow are the same as the first embodiment.

According to the second embodiment, when the second etching step starts, the top surface of the bottom forming layer 42 is covered with the initial groove mask 73 in the region in which the second portion 43a2 of the groove 43a is to be formed, except the ring-like region near the initial sidewall SW2P. Consequently, according to the present embodiment, it is possible to suppress formation of the sidewall-protecting film on the sidewall SW2 of the second portion 43a2 of the groove 43a caused by the substances flying off due to etching of the bottom forming layer 42 during the second etching step. This serves to prevent an increase in the angle formed by the sidewall SW2 with respect to the direction perpendicular to the top surface of the substrate 1. As a result, according to the present embodiment, the advantageous effects of being capable of preventing the problems resulting from the skew, capable of defining the track width with precision and capable of improving the write characteristics are exerted more remarkably.

The remainder of configuration, function and effects of the second embodiment are similar to those of the first embodiment.

The present invention is not limited to the foregoing embodiments but can be carried out in various modifications. For example, in each of the foregoing embodiments, a coil helically wound around the pole layer 16 may be provided in place of the planar spiral-shaped coils 9 and 23.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A method of manufacturing a magnetic head for perpendicular magnetic recording, the magnetic head comprising:

a medium facing surface that faces toward a recording medium;
a coil that generates a magnetic field corresponding to data to be written on the recording medium;
a pole layer that allows a magnetic flux corresponding to the magnetic field generated by the coil to pass and generates a write magnetic field for writing the data on the recording medium by means of a perpendicular magnetic recording system;
a bottom forming layer made of a nonmagnetic material;
an encasing layer made of a nonmagnetic material, disposed on the bottom forming layer, and having a groove that opens at a top surface of the encasing layer and that accommodates the pole layer; and
a substrate on which the bottom forming layer, the encasing layer, the pole layer and the coil are stacked, the substrate having a top surface, wherein:
the pole layer includes: a track width defining portion having an end face that is located in the medium facing surface and that defines a track width, and having an end opposite to the end face; and a wide portion connected to the end of the track width defining portion and having a width greater than that of the track width defining portion;
the end face of the track width defining portion located in the medium facing surface has a width that decreases with decreasing distance from the top surface of the substrate;
the groove includes: a first portion for accommodating at least part of the track width defining portion of the pole layer; and a second portion for accommodating at least part of the wide portion of the pole layer, the second portion being farther from the medium facing surface than the first portion;
the first portion has a width that decreases with decreasing distance from the top surface of the substrate; and
the second portion penetrates the encasing layer,
the method comprising the steps of:
forming the bottom forming layer;
forming a nonmagnetic layer on the bottom forming layer, the nonmagnetic layer being intended to undergo formation of the groove therein later to thereby become the encasing layer;
forming a groove defining layer on the nonmagnetic layer, the groove defining layer having a penetrating opening that has a shape corresponding to a plane geometry of the groove to be formed later;
forming the groove in the nonmagnetic layer so that the nonmagnetic layer becomes the encasing layer;
forming the pole layer such that the pole layer is accommodated in the groove of the encasing layer; and
forming the coil,
wherein the step of forming the groove in the nonmagnetic layer includes:
a first etching step for taper-etching the nonmagnetic layer by reactive ion etching so as to form an initial groove in the nonmagnetic layer, the initial groove including the first portion of the groove of the encasing layer;
a step of forming an initial groove mask that covers the first portion of the initial groove; and
a second etching step for etching the nonmagnetic layer by reactive ion etching, with the initial groove mask and the groove defining layer used as an etching mask, so as to complete the groove, and wherein:
each of the bottom forming layer and the groove defining layer is lower in etching rate in the first and second etching steps than the nonmagnetic layer;
in the first etching step, the nonmagnetic layer is etched such that an initial sidewall is formed by the initial groove in a region in which the second portion is to be formed, the initial sidewall being intended to be etched in the second etching step later to thereby become a sidewall of the second portion, and such that part of the nonmagnetic layer remains on the bottom forming layer in the region in which the second portion is to be formed; and in the second etching step, the initial sidewall is etched to thereby form the sidewall of the second portion.

2. The method according to claim 1, wherein the nonmagnetic layer is formed of $Al_2O_3$, and each of the bottom forming layer and the groove defining layer is formed of a nonmagnetic metal material.

3. The method according to claim 1, wherein, in the second etching step, the initial sidewall is etched so that an angle formed by the sidewall of the second portion with respect to a direction perpendicular to the top surface of the substrate will be smaller than an angle formed by the initial sidewall with respect to the direction perpendicular to the top surface of the substrate.

4. The method according to claim 1, wherein the step of forming the groove in the nonmagnetic layer further includes a step of forming a mask on the nonmagnetic layer before the first etching step so that, in the region in which the second portion is to be formed, part of the nonmagnetic layer will remain on the bottom forming layer in the first etching step.

5. A method of manufacturing a magnetic head for perpendicular magnetic recording, the magnetic head comprising:
a medium facing surface that faces toward a recording medium;
a coil that generates a magnetic field corresponding to data to be written on the recording medium;
a pole layer that allows a magnetic flux corresponding to the magnetic field generated by the coil to pass and generates a write magnetic field for writing the data on the recording medium by means of a perpendicular magnetic recording system;
a bottom forming layer made of a nonmagnetic material;
an encasing layer made of a nonmagnetic material, disposed on the bottom forming layer, and having a groove that opens at a top surface of the encasing layer and that accommodates the pole layer; and
a substrate on which the bottom forming layer, the encasing layer, the pole layer and the coil are stacked, the substrate having a top surface, wherein:
the pole layer includes: a track width defining portion having an end face that is located in the medium facing surface and that defines a track width, and having an end opposite to the end face; and a wide portion connected to the end of the track width defining portion and having a width greater than that of the track width defining portion;
the end face of the track width defining portion located in the medium facing surface has a width that decreases with decreasing distance from the top surface of the substrate;
the groove includes: a first portion for accommodating at least part of the track width defining portion of the pole layer; and a second portion for accommodating at least part of the wide portion of the pole layer, the second portion being farther from the medium facing surface than the first portion;

the first portion has a width that decreases with decreasing distance from the top surface of the substrate; and
the second portion penetrates the encasing layer,
the method comprising the steps of:
forming the bottom forming layer;
forming a nonmagnetic layer on the bottom forming layer, the nonmagnetic layer being intended to undergo formation of the groove therein later to thereby become the encasing layer;
forming a groove defining layer on the nonmagnetic layer, the groove defining layer having a penetrating opening that has a shape corresponding to a plane geometry of the groove to be formed later;
forming the groove in the nonmagnetic layer so that the nonmagnetic layer becomes the encasing layer;
forming the pole layer such that the pole layer is accommodated in the groove of the encasing layer; and
forming the coil,
wherein the step of forming the groove in the nonmagnetic layer includes:
a first etching step for taper-etching the nonmagnetic layer by reactive ion etching so as to form an initial groove in the nonmagnetic layer, the initial groove including the first portion of the groove of the encasing layer;
a step of forming an initial groove mask that covers the first portion of the initial groove; and
a second etching step for etching the nonmagnetic layer by reactive ion etching, with the initial groove mask and the groove defining layer used as an etching mask, so as to complete the groove, and wherein:
each of the bottom forming layer and the groove defining layer is lower in etching rate in the first and second etching steps than the nonmagnetic layer;
in the first etching step, the nonmagnetic layer is etched such that an initial sidewall is formed by the initial groove in a region in which the second portion is to be formed, the initial sidewall being intended to be etched in the second etching step later to thereby become a sidewall of the second portion, and such that a top surface of the bottom forming layer is exposed in the region in which the second portion is to be formed;
in the step of forming the initial groove mask, the initial groove mask is formed such that the initial groove mask covers, in addition to the first portion, part of the top surface of the bottom forming layer exposed by the initial groove in the region in which the second portion is to be formed; and
in the second etching step, the initial sidewall is etched to thereby form the sidewall of the second portion.

6. The method according to claim 5, wherein the nonmagnetic layer is formed of $Al_2O_3$, and each of the bottom forming layer and the groove defining layer is formed of a nonmagnetic metal material.

7. The method according to claim 5, wherein, in the second etching step, the initial sidewall is etched so that an angle formed by the sidewall of the second portion with respect to a direction perpendicular to the top surface of the substrate will be smaller than an angle formed by the initial sidewall with respect to the direction perpendicular to the top surface of the substrate.

* * * * *